US012783156B2

(12) United States Patent
Kim et al.

(10) Patent No.: US 12,783,156 B2
(45) Date of Patent: Nov. 3, 2026

(54) STORAGE DEVICE, STORAGE CONTROLLER AND OPERATING METHOD OF STORAGE CONTROLLER

(71) Applicant: SAMSUNG ELECTRONICS CO., LTD., Suwon-si (KR)

(72) Inventors: Chanha Kim, Suwon-si (KR); Namwook Kang, Suwon-si (KR); Soojun Im, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 117 days.

(21) Appl. No.: 18/529,645

(22) Filed: Dec. 5, 2023

(65) Prior Publication Data

US 2024/0184482 A1 Jun. 6, 2024

(30) Foreign Application Priority Data

Dec. 5, 2022 (KR) ........................ 10-2022-0168098

(51) Int. Cl.
*G06F 3/00* (2006.01)
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| | | | |
|---|---|---|---|
| 6,449,625 | B1 | 9/2002 | Wang |
| 7,450,420 | B2 | 11/2008 | Sinclair et al. |
| 7,730,213 | B2 | 6/2010 | Howard |
| 8,954,435 | B2 | 2/2015 | Patwardhan et al. |
| 9,251,019 | B2 | 2/2016 | Losh et al. |
| 9,430,376 | B2 | 8/2016 | Horn |
| 9,602,426 | B2 | 3/2017 | Das et al. |
| 10,387,387 | B2 | 8/2019 | Lam et al. |
| 10,503,704 | B2 | 12/2019 | Narasayya et al. |

(Continued)

FOREIGN PATENT DOCUMENTS

KR 10-2022-0063755 A 5/2022

OTHER PUBLICATIONS

Communication issued May 8, 2024 by the European Patent Office in European Patent Application No. 23214217.4.

*Primary Examiner* — Craig S Goldschmidt
(74) *Attorney, Agent, or Firm* — Sughrue Mion, PLLC

(57) ABSTRACT

A storage device includes a non-volatile memory and storage controller. The non-volatile memory includes a plurality of physical blocks coupled to each other via a plurality of dies. Each die of the plurality of dies is coupled to a corresponding bank via a corresponding channel. The storage controller is configured to receive, from a plurality of hosts, a plurality of pieces of physical function (PF) data. The storage controller is further configured to measure metrics of the plurality of pieces of PF data and the plurality of dies. The storage controller is further configured to allocate, according to a die allocation policy and based at least on the measured metrics, the plurality of pieces of PF data to one or more dies of the plurality of dies. Each die of the plurality of dies is allocated to a corresponding host of the plurality of hosts.

10 Claims, 20 Drawing Sheets

(56) References Cited

U.S. PATENT DOCUMENTS

| | | | |
|---|---|---|---|
| 10,853,334 | B2 | 12/2020 | Gangadhar et al. |
| 11,422,931 | B2 | 8/2022 | Li |
| 2007/0233752 | A1 | 10/2007 | Bangalore et al. |
| 2010/0174853 | A1 | 7/2010 | Lee et al. |
| 2014/0189210 | A1 | 7/2014 | Sinclair et al. |
| 2017/0123655 | A1 | 5/2017 | Sinslair et al. |
| 2017/0123682 | A1 | 5/2017 | Sinclair |
| 2018/0081832 | A1* | 3/2018 | Longo .................. G06F 3/0679 |
| 2020/0089537 | A1 | 3/2020 | Bahirat et al. |
| 2020/0104074 | A1* | 4/2020 | Brown .................. G06F 3/0653 |
| 2022/0147392 | A1 | 5/2022 | Choi et al. |
| 2022/0308958 | A1 | 9/2022 | Peh et al. |

* cited by examiner

1000

| Die | Address | Read Performance | Write Performance |
|---|---|---|---|
| 0 | Channel 0 Bank 0 | 1000MB/s | 500MB/s |
| 1 | Channel 0 Bank 1 | 500MB/s | 250MB/s |
| 2 | Channel 1 Bank 0 | 1000MB/s | 500MB/s |
| 3 | Channel 1 Bank 1 | 500MB/s | 250MB/s |

STORAGE DEVICE, STORAGE CONTROLLER AND OPERATING METHOD OF STORAGE CONTROLLER

CROSS-REFERENCE TO RELATED APPLICATIONS

This application claims benefit of priority under 35 U.S.C. § 119 to Korean Patent Application No. 10-2022-0168098, filed on Dec. 5, 2022, in the Korean Intellectual Property Office, the disclosure of which is incorporated by reference herein in its entirety.

BACKGROUND

1. Field

The present disclosure relates generally to a memory device, and more particularly, to a storage controller, a storage device including the storage controller, and an operating method of the storage controller.

2. Description of Related Art

Non-volatile memories, such as, but not limited to, flash memories, may retain data stored therein when power is blocked (e.g., not applied). Storage devices utilizing such non-volatile memories (e.g., embedded multi-media cards (eMMCs), universal flash storages (UFSs), solid state drives (SSDs), memory cards, and the like) may be widely used. That is, the storage devices may be used to store and/or move large amounts of data.

In order to potentially meet an increase in demand for storage capacity, implementation of the storage devices using multiple physical function (MPF) devices may be increasing. The MPF devices may perform several functions within one device, such as, but not limited to, storing data provided by a plurality of users in a multi-tenancy environment and/or storing data provided by a plurality of applications.

There exists a need for further improvements in MPF devices, as the need for storing various physical function (PF) data in a mixed manner may be constrained by a high cost (e.g., performance, resources, and the like) may be incurred by garbage collection (GC) in the related MPF devices. Improvements are presented herein. These improvements may also be applicable to other storage devices and/or storage device technologies.

SUMMARY

The present disclosure provides a storage device that potentially reduces the number of performance cycles of garbage collection (GC), when compared with a related storage device, by respectively allocating different dies for different physical function (PF) data, a storage controller, and an operating method of the storage controller.

According to an aspect of the present disclosure, a storage device is provided. The storage device includes a non-volatile memory and a storage controller. The non-volatile memory includes a plurality of physical blocks coupled to each other via a plurality of dies. Each die of the plurality of dies is coupled to a corresponding bank via a corresponding channel. The storage controller is configured to receive, from a plurality of hosts, a plurality of pieces of physical function (PF) data. The storage controller is further configured to measure metrics of the plurality of pieces of PF data and the plurality of dies. The storage controller is further configured to allocate, according to a die allocation policy and based at least on the measured metrics, the plurality of pieces of PF data to one or more dies of the plurality of dies. Each die of the plurality of dies is allocated to a corresponding host of the plurality of hosts.

According to an aspect of the present disclosure, a storage device is provided. The storage device includes a non-volatile memory and a storage controller. The non-volatile memory includes a plurality of physical blocks coupled to each other via a plurality of dies. Each die of the plurality of dies is coupled to a corresponding bank via a corresponding channel. The storage controller is configured to receive first PF data from a first host. The storage controller is further configured to receive second PF data from a second host. The storage controller is further configured to allocate first dies from among the plurality of dies to the first PF data, based on a first required performance of the first PF data and a second required performance the second PF data. The storage controller is further configured to allocate remaining dies from among the plurality of dies to the second PF data.

According to an aspect of the present disclosure, a storage device is provided. The storage device includes a non-volatile memory and a storage controller. The non-volatile memory includes a plurality of physical blocks coupled to each other via a plurality of dies. The plurality of dies includes first dies allocated to store first PF data received from a first host, and second dies allocated to store second PF data received from a second host. The storage controller is configured to receive third PF data from a third host different from the first host and the second host. The storage controller is further configured to reallocate at least a first portion of the first dies and at least a second portion of the second dies to the third PF data. The storage controller is further configured to store the third PF data according to a die reflection policy.

Additional aspects may be set forth in part in the description which follows and, in part, may be apparent from the description, and/or may be learned by practice of the presented embodiments.

BRIEF DESCRIPTION OF DRAWINGS

The above and other aspects, features, and advantages of certain embodiments of the present disclosure are to be more apparent from the following description taken in conjunction with the accompanying drawings, in which.

DETAILED DESCRIPTION

Figure 1A:
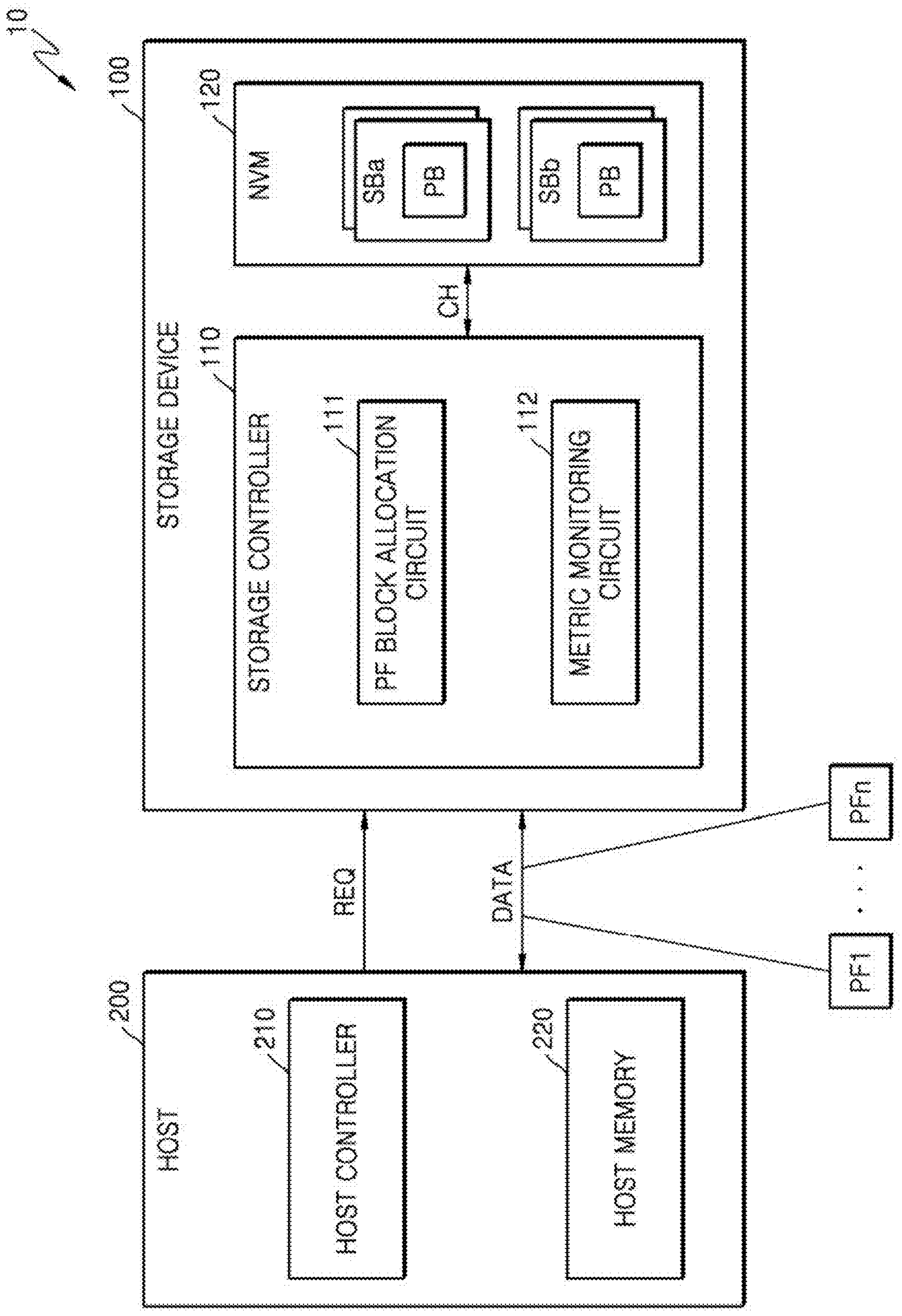
FIGS. 1A and 1B depict block diagrams of a storage system, according to various embodiments of the present disclosure.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art are to recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wired), wirelessly, or via a third element.

It is to be understood that when an element or layer is referred to as being “over,” “above,” “on,” “below,” “under,” “beneath,” “connected to” or “coupled to” another element or layer, it can be directly over, above, on, below, under, beneath, connected or coupled to the other element or layer or intervening elements or layers may be present. In contrast, when an element is referred to as being “directly over,” “directly above,” “directly on,” “directly below,” “directly under,” “directly beneath,” “directly connected to” or “directly coupled to” another element or layer, there are no intervening elements or layers present.

The terms “upper,” “middle”, “lower”, etc. may be replaced with terms, such as “first,” “second,” third” to be used to describe relative positions of elements. The terms “first,” “second,” third” may be used to described various elements but the elements are not limited by the terms and a “first element” may be referred to as a “second element”. Alternatively or additionally, the terms “first”, “second”, “third”, etc. may be used to distinguish components from each other and do not limit the present disclosure. For example, the terms “first”, “second”, “third”, etc. may not necessarily involve an order or a numerical meaning of any form.

Reference throughout the present disclosure to “one embodiment,” “an embodiment,” “an example embodiment,” or similar language may indicate that a particular feature, structure, or characteristic described in connection with the indicated embodiment is included in at least one embodiment of the present solution. Thus, the phrases “in one embodiment”, “in an embodiment,” “in an example embodiment,” and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Hereinafter, various embodiments of the present disclosure are described with reference to the accompanying drawings.

Figure 1B:
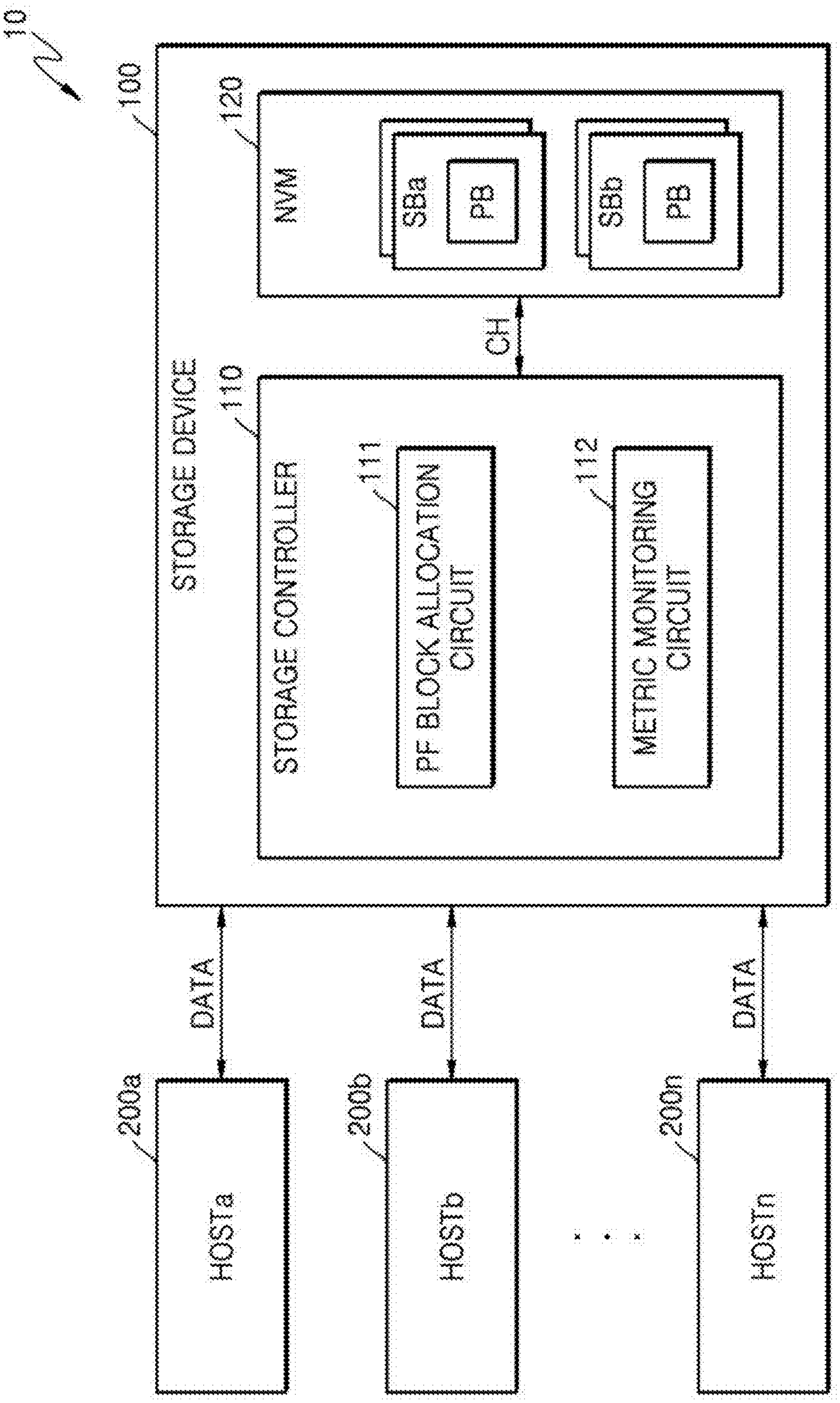

FIGS. 1A and 1B depict block diagrams of a storage system 10, according to various embodiments of the present disclosure.

Referring to FIG. 1A, the storage system 10 may include a storage device 100 and a host 200, and accordingly, may be referred to as a host-storage system. The storage device 100 may include a storage controller 110 and a non-volatile memory (NVM) 120. The storage controller 110 may be connected (e.g., coupled) to the NVM 120 via a channel CH.

According to an embodiment, the storage controller 110 may also be referred to as a controller, a device controller, and/or a memory controller. According to an embodiment, the NVM 120 may be implemented with a plurality of memory chips and/or a plurality of memory dies. For example, each of the plurality of memory chips may include a dual die package (DDP), a quadruple die package (QDP), and/or an octuple die package (ODP).

As shown in FIG. 1A, the host 200 may include a host controller 210 and a host memory 220. In an embodiment, the host memory 220 may function as a buffer memory and may be configured to temporarily store data to be transmitted to (e.g., received by) the storage device 100, and/or data transmitted by the storage device 100. For example, the host controller 210 may include at least one of a plurality of modules provided in an application processor (AP). Alternatively or additionally, the AP may be implemented as a system on chip (SoC). In an embodiment, the host memory 220 may include an embedded memory provided in the AP, an NVM, and/or a memory module arranged outside the AP.

According to an embodiment, data DATA may be transmitted to the storage device 100 by the host 200 that may include a plurality of pieces of physical function (PF) data. Each piece of PF data of the plurality of pieces of PF data (e.g., PF1, PF2, . . . , PFn, where n is a positive integer greater than zero) may represent write data provided by a plurality of applications executable via the AP. For example, first PF data PF1 may represent data that a first application of the plurality of applications has requested the storage device 100 to write. For another example, second PF data PF2 may represent data that a second application of the plurality of applications has requested the storage device 100 to write. For another example, $n^{th}$ PF data PFn may represent data that a $n^{th}$ application of the plurality of applications has requested the storage device 100 to write. In an embodiment, characteristics of the first PF data PF1, the second PF data PF2, and the $n^{th}$ PF data PFn may be different from each other. For example, the lifetime of the first PF data PF1 may be relatively long, and the lifetime of the second PF data PF2 may be relatively short. For another example, a terabytes written (TBW) size of the first PF data PF1 may be greater than a TBW size of the second PF data PF2 and a TBW size of the $n^{th}$ PF data PFn.

Referring to FIG. 1B, the storage device 100 may receive data DATA from each of a plurality of hosts (e.g., first host HOSTa 200*a*, second HOSTb 200*b*, . . . , $n^{th}$ HOSTn 200*n*, where n is a positive integer greater than zero). For example, the storage device 100 may be arranged in a data center and/or inside a server device. In an embodiment, the plurality of hosts may be referred to as multi-tenants. For example, the first host HOSTa 200*a* may be and/or include a host corresponding to a first user from among a plurality of users. The second host HOSTb 200*b* may be and/or include a host corresponding to a second user from among the plurality of users. The $n^{th}$ host HOSTn 200*n* may be and/or include a host corresponding to a $n^{th}$ user from among the plurality of users. Alternatively or additionally, the data DATA transmitted by the first host HOSTa 200*a* may include the first PF data PF1, the data DATA transmitted by the second host HOSTb 200*b* may include the second PF data PF2, and the DATA transmitted by the $n^{th}$ host HOSTn 200*n* may include the $n^{th}$ PF data PFn.

Referring to FIG. 1A, the storage controller 110 may control the NVM 120 to write data DATA in the NVM 120 in response to a write request REQ from the host 200. Alternatively or additionally, the storage controller 110 may control the NVM 120 to read data DATA stored in the NVM 120 in response to the read request REQ from the host 200. Accordingly, the storage device 100 may include storage media for storing data DATA according to the write request REQ from the host 200. For example, the storage device 100 may include, but not be limited to, at least one of a solid state drive (SSD), an embedded memory, and a removable external memory. In an embodiment, when the storage device 100 includes the SSD, the storage device 100 may include a device complying with one or more NVM express (NVMe) standards (e.g., NVMe, Peripheral Component Interconnect (PCI), PCI Express (PCIe), NVMe over Fabrics, and the like). In an optional or additional embodiment, when the storage device 100 includes an embedded memory and/or an external memory, the storage device 100 may include a device complying with at least one of the universal flash storage (UFS) standard, the embedded multi-media card (eMMC) standard, and the like. That is, the host 200 and the storage device 100 may generate and/or transmit packets according to one or more adopted storage protocol standards.

The NVM 120 may include a plurality of super blocks (e.g., first super block SBa, second super block SBb). Each super block of the plurality of super blocks may include a plurality of physical blocks PB. Each physical block of the plurality of physical blocks PB may include a plurality of pages. For example, each physical block of the plurality of physical blocks PB may include four (4) pages.

The storage controller 110 may include a PF block allocation circuit 111. The PF block allocation circuit 111 may be configured to allocate blocks to a plurality of pieces of PF data such that the plurality of pieces of PF data may be separated and/or isolated from each other and stored. That is, when writing the plurality of pieces of PF data, the PF block allocation circuit 111 may allocate PF storage blocks so that the plurality of pieces of PF data may not be sequentially written. Alternatively or additionally, each piece of PF data may be stored such that several pieces of PF data may not be mixed (e.g., stored) in one physical block PB. According to various embodiments, the PF block allocation circuit 111 may store the plurality of pieces of PF data in physical blocks PB separated from each other, based on a plurality of block allocation policies. For example, the plurality of block allocation policies may include a performance proportion policy, a performance assurance policy, a die performance-based policy, and an erase count (EC)-based policy. The plurality of block allocation policies are described with reference to FIGS. 8A to 11.

The storage controller 110 may include a metric monitoring circuit 112. The metric monitoring circuit 112 may monitor metric indicators required for the plurality of block allocation policies. For example, the metric monitoring circuit 112 may monitor the TBW size for each PF, and/or monitor the required performance for each PF. For another example, the metric monitoring circuit 112 may monitor performance of each of the plurality of dies, and/or may monitor EC values of the plurality of dies. In an embodiment, the metric monitoring circuit 112 may provide the EC value and the TBW size of each PF of each of the monitored plurality of dies to the PF block allocation circuit 111. In such an embodiment, the EC value and the TBW size of each PF of each of the plurality of dies may be used for the EC-based policy. Alternatively or additionally, the metric monitoring circuit 112 may provide the monitored required performance for each PF to the PF block allocation circuit 111. In such an embodiment, the required performance for each PF may be used for the performance proportion policy and/or the performance assurance policy.

Figure 2:
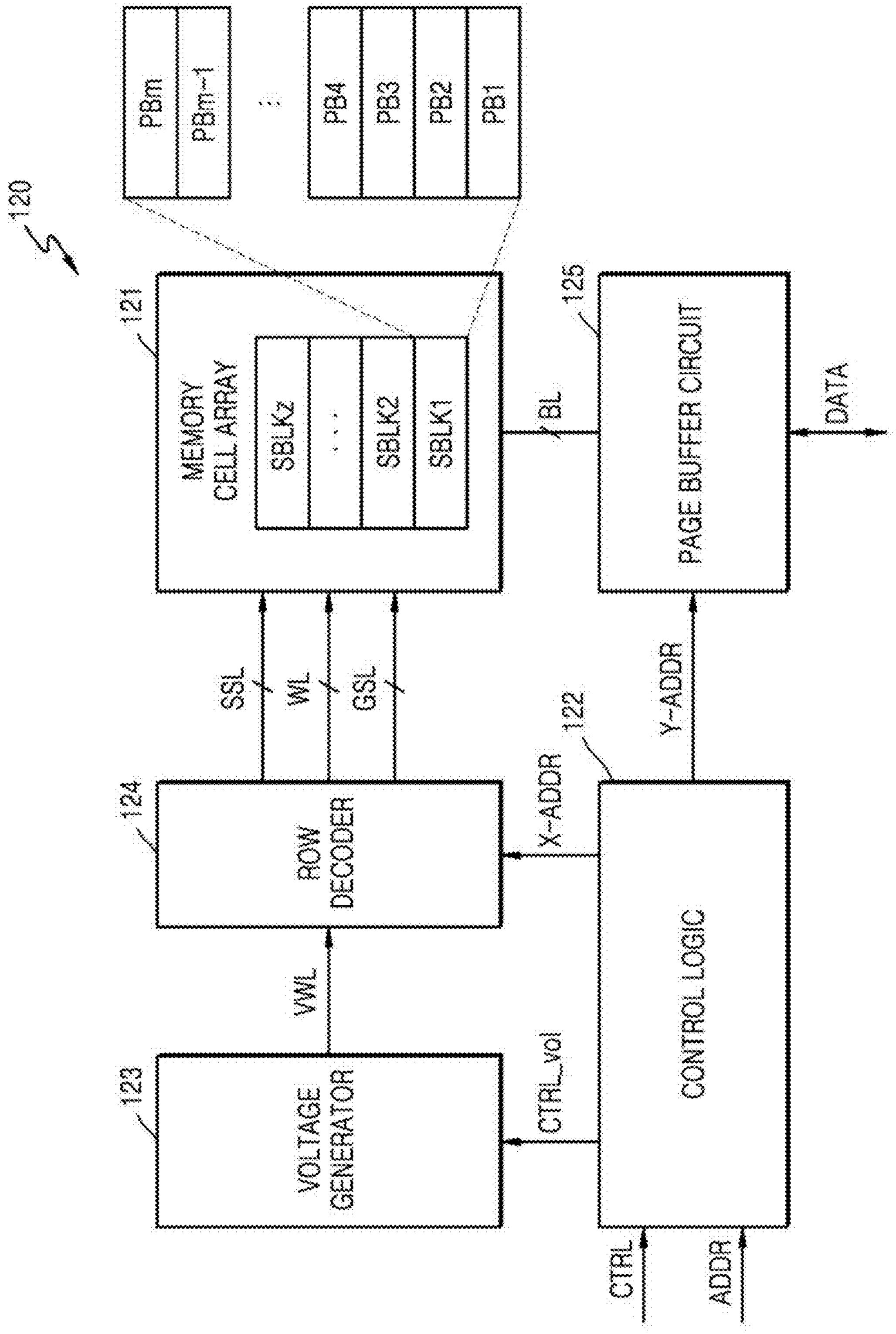
FIG. 2 illustrates a block diagram of a non-volatile memory, according to various embodiments of the present disclosure.

FIG. 2 illustrates a block diagram of the NVM 120, according to various embodiments of the present disclosure.

Referring to FIG. 2, the NVM 120 may include a memory cell array 121, a control logic circuitry 122, a voltage generator 123, a row decoder 124, and a page buffer circuit 125. In some embodiments, the NVM 120 may further include a memory interface circuit, column logic, a pre-decoder, a command decoder, an address decoder, and the like.

The memory cell array 121 may include a plurality of super blocks (e.g., first super block SBLK1, second super block SBLK2, . . . , $z^{th}$ super block SBLKz, hereinafter "SBLK" generally). Each of the plurality of super blocks SBLK may include a plurality of physical blocks (e.g., first physical block PB1, second physical block PB2, third physical block PB3, fourth physical block PB4, . . . , $(m-1)^{th}$ physical block PBm−1, and $m^{th}$ physical block PBm, hereinafter "PB" generally). Each of the plurality of physical blocks PB may include a plurality of pages (e.g., four (4) pages). As used herein, z and m may be positive integers greater than zero (0) and may be variously changed according to embodiments and/or design constraints. In an embodiment, a memory block may be a unit of erase, and/or a page may be a unit of write and/or read. Alternatively or additionally, the plurality of super blocks SBLK may be and/or include the first and second super blocks SBa and SBb shown in FIGS. 1A and 1B. As shown in FIG. 2, the memory cell array 121 may be connected to the page buffer circuit 125 via bit lines BL, and/or may be connected to the row decoder 124 via word lines WL, string selection lines SSL, and ground selection lines GSL.

In an embodiment, the memory cell array 121 may be and/or include a three-dimensional (3D) memory cell array. The 3D memory cell array may be and/or include a plurality of NAND strings. Each NAND string may include memory cells which may be respectively connected to word lines WL vertically stacked on a substrate. U.S. Pat. Nos. 7,679,133, 8,553,466, 8,654,587, 8,559,235, and 9,536,970 disclose semiconductor memory devices, the disclosures of which are incorporated by reference herein in their entireties.

In an optional or additional embodiment, the memory cell array 121 may be and/or include a two-dimensional (2D) memory cell array. The 2D memory cell array may be and/or include the plurality of NAND strings which may are arranged in rows and columns. Alternatively or additionally, the memory cell array 121 may include various other types of NVMs, such as, but not limited to, a magnetic RAM (MRAM), spin-transfer torque MRAM (STT MRAM), conductive bridging RAM (CBRAM), ferroelectric RAM (FeRAM), phase RAM (PRAM), resistive RAM (RRAM), and the like.

The control logic circuitry 122 may control various operations in the NVM 120. That is, the control logic circuitry 122 may output various control signals in response to a command CMD and/or an address ADDR. For example, the control logic circuitry 122 may output a voltage control signal CTRL_vol, a row address X_ADDR, and a column address Y_ADDR.

The voltage generator 123 may generate various types of voltages for performing program, read, and/or erase operations based on the voltage control signal CTRL_vol. For example, the voltage generator 123 may generate, as a word line voltage VWL, a program voltage, a read voltage, a program verification voltage, an erase voltage, and the like.

The row decoder 124 may select one of the plurality of word lines WL in response to the row address X_ADDR, and/or may select one of the plurality of string selection lines SSL. For example, during the program operation, the row decoder 124 may apply the program voltage and the program verification voltage to the selected word line WL. For another example, during the read operation, the row decoder 124 may apply the read voltage to the selected word line WL.

The page buffer circuit 125 may select at least one bit line BL among the bit lines BL in response to the column address Y_ADDR. The page buffer circuit 125 may operate as a write driver and/or a sense amplifier according to an operation mode.

Figure 3:
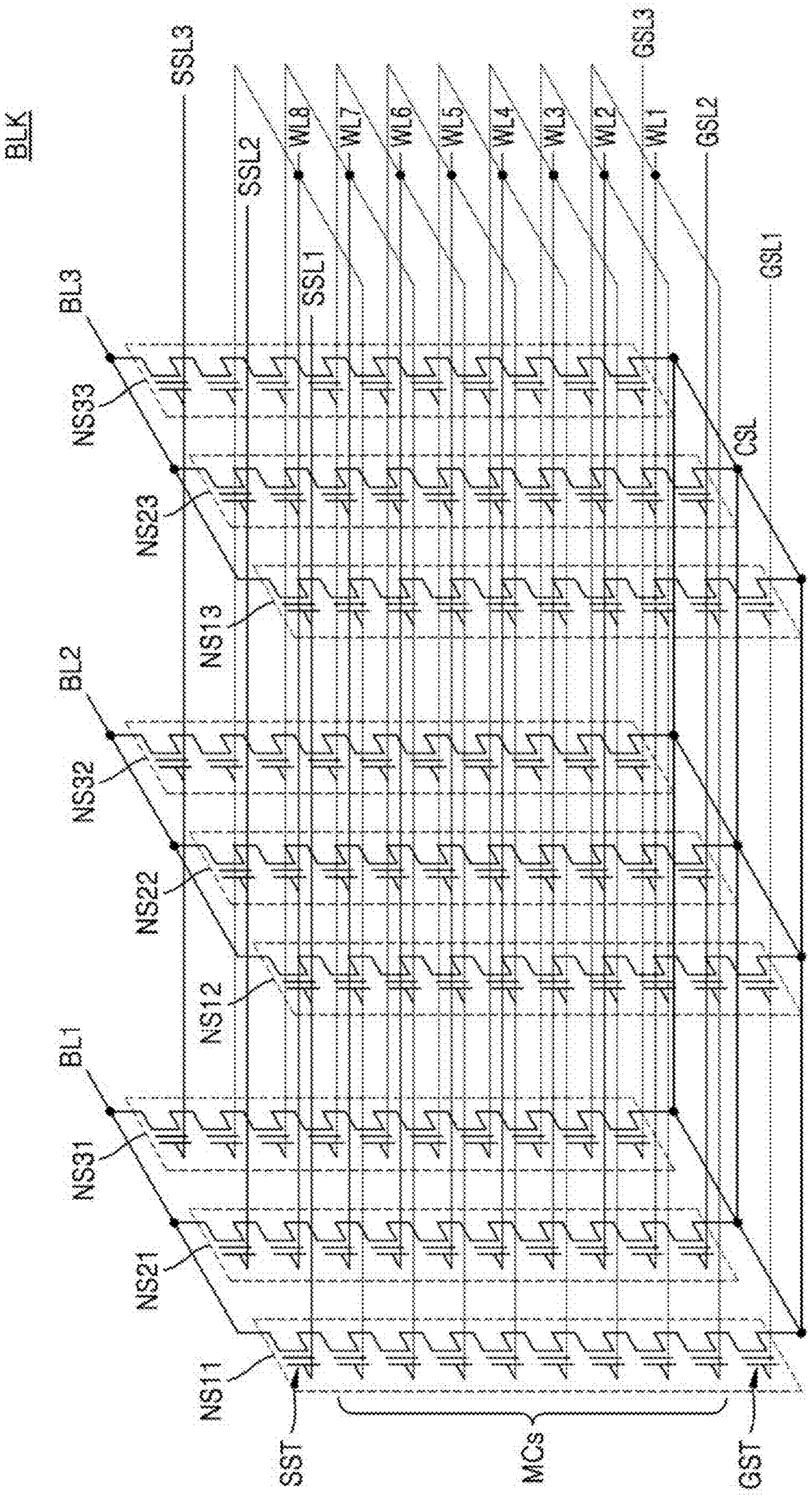
FIG. 3 depicts a circuit diagram of a memory block, according to various embodiments of the present disclosure.

FIG. 3 depicts a circuit diagram of the memory block BLK, according to various embodiments of the present disclosure.

Referring to FIG. 3, the memory block BLK may include or may be similar in many respects to one of the plurality of memory blocks SBLK described above with reference to FIG. 2, and may include additional features not mentioned above. The memory block BLK may include NAND strings NS11 through NS33. Each NAND string (e.g., NS11) may include a string selection transistor SST, a plurality of memory cells MC, and a ground selection transistor GST, which may be connected to each other in series. The string selection transistor SST, the ground selection transistor GST, and the memory cells MC, which may be included in each NAND string, may form a structure stacked in a vertical direction on a substrate.

In an embodiment, bit lines (e.g., first bit line BL1, second bit line BL2, and third bit line BL3, hereinafter "BL" generally) may extend in a first direction. Alternatively or additionally word lines (e.g., first word line WL1, second word line WL2, third word line WL3, fourth word line WL4, fifth word line WL5, sixth word line WL6, seventh word line WL7, and eighth word line WL8) may extend in a second direction. In an embodiment, the NAND strings NS11, NS21, and NS31 may be between the first bit line BL1 and the common source line CSL, the NAND strings NS12, NS22, and NS32 may be between the second bit line BL2 and the common source line CSL, and the NAND strings NS13, NS23, and NS33 may be between the third bit line BL3 and the common source line CSL.

The string selection transistor SST may be connected to a corresponding string selection line (e.g., first string selection line SSL1, second string selection line SSL2, and third string selection line SSL3). The memory cells MC may be respectively connected to the word lines (e.g., WL1 through WL8). The ground selection transistor GST may be connected to a corresponding ground selection line (e.g., first ground selection line GSL1, second ground selection line GSL2, and third ground selection line GSL3). The string selection transistor SST may be connected to a corresponding bit line BL, and the ground selection transistor GST may be connected to the common source line CSL. In such embodiments, the number of NAND strings, the number of word lines WL, the number of bit lines BL, the number of ground selection lines GSL, and the number of string selection lines SSL may be variously changed, according to an embodiment and/or design constraints.

Figure 4:
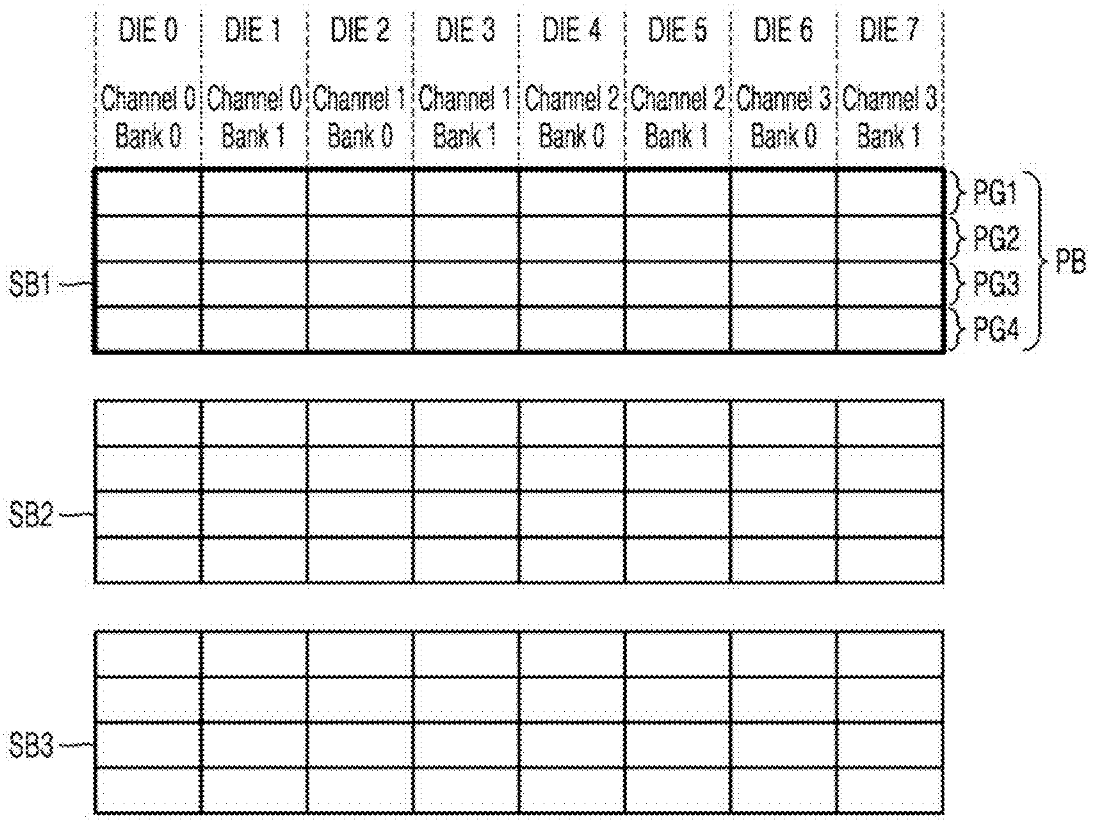
FIG. 4 illustrates a plurality of dies, physical blocks, and super blocks, according to various embodiments of the present disclosure.

FIG. 4 illustrates a plurality of dies, a plurality of physical blocks, and a plurality of super blocks, according to various embodiments of the present disclosure.

Referring to FIG. 4, a plurality of dies is illustrated. Each die of the plurality of dies (e.g., zeroth die DIE 0, first die DIE 1, second die DIE 2, third die DIE 3, fourth die DIE 4, fifth die DIE 5, sixth die DIE 6, and seventh die DIE 7) may be connected to a channel capable of input/output operations simultaneously. Alternatively or additionally, the dies of the plurality of dies may be respectively connected to different banks. For example, the zeroth die DIE 0 may be connected to a zeroth memory bank Bank 0 of a zeroth channel Channel 0, the first die DIE 1 may be connected to a first memory bank Bank 1 of the zeroth channel Channel 0, the second die DIE 2 may be connected to a zeroth memory bank Bank 0 of a first channel Channel 1, the third die DIE 3 may be connected to a first memory bank Bank 1 of the first channel Channel 1, the fourth die DIE 4 may be connected to a zeroth memory bank Bank 0 of a second channel Channel 2, the fifth die DIE 5 may be connected to a first memory bank Bank 1 of the second channel Channel 2, the sixth die DIE 6 may be connected to a zeroth memory bank Bank 0 of a third channel Channel 3, and the seventh die DIE 7 may be connected to a first memory bank Bank 1 of the third channel Channel 3.

According to an embodiment, allocating a die to the PF data may refer to sequentially writing the PF data to a memory block connected to the allocated die, when programming the PF data to the NVM 120. For example, when the first PF data PF1 is allocated to the zeroth die DIE 0, a plurality of first PF data PF1 may be sequentially written to the first super block SB1 through the third super block SB3. The first PF data PF1 may be sequentially programmed on a first page through a fourth page of the physical block PB corresponding to the first super block SB1. Thereafter, the first PF data PF1 may be sequentially programmed on the first page through the fourth page of the physical block PB corresponding to the second super block SB2 of a next order.

According to the embodiment described above, one physical block PB is illustrated to include four pages PG, and a super block SB is illustrated to include physical blocks PBs corresponding to eight dies, however, the embodiment is not limited thereto. According to various embodiments, the number of dies and/or the number of pages may be variously changed.

Figure 5:
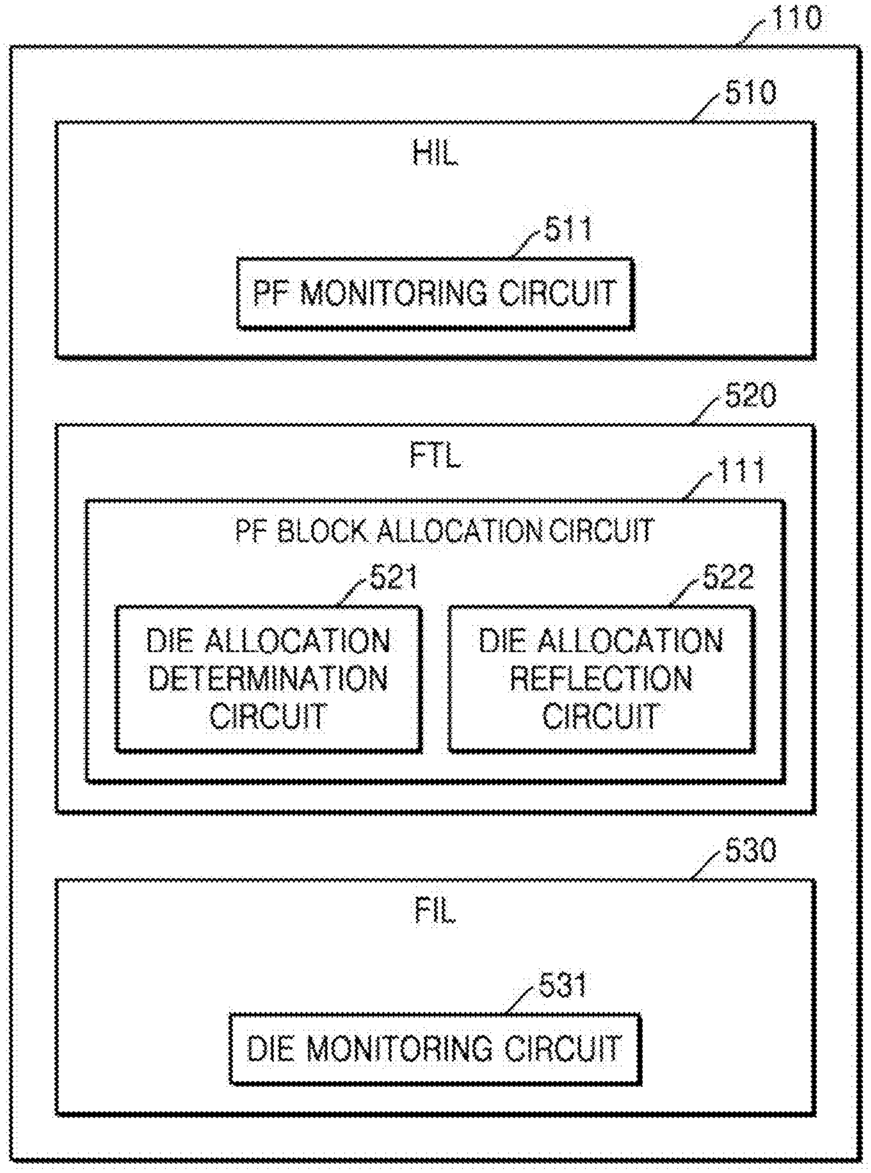
FIG. 5 depicts a block diagram of a software layer structure of a storage controller, according to various embodiments of the present disclosure.

FIG. 5 depicts a block diagram of a software layer structure of the storage controller 110, according to various embodiments of the present disclosure.

Referring to FIG. 5, the storage controller 110 may have a plurality of software layer structures. The storage controller 110 may include a host interface layer (HIL), a flash translation layer (FTL) 520, and a flash interface layer (FIL) 530.

The HIL 510 may transmit read and/or write requests from a host (e.g., the host 200 of FIG. 1A, first through $n^{th}$ hosts HOSTa 200*a* through HOSTn 200*n* of FIG. 1B) to the FTL 520. Referring to FIGS. 1A and 1B together with FIG. 5, at least a portion of the metric monitoring circuit 112 of the storage controller 110 may be included in the HIL 510. For example, a PF monitoring circuit 511 of the metric monitoring circuit 112 may be included in the HIL 510. The PF monitoring circuit 511 may track the TBW size of each PF in the metric monitoring circuit 112, and/or monitor the required performance for each PF (e.g., a write speed, a read speed). That is, the PF monitoring circuit 511 may receive the plurality of pieces of PF data received from a host (e.g., the host 200 of FIG. 1A, the first through $n^{th}$ hosts HOSTa 200*a* through HOSTn 200*n* of FIG. 1B), monitor the TBW for each of the plurality of pieces of PF data, and/or monitor the required performance of each PF. Alternatively or additionally, the host (e.g., the host 200 of FIG. 1A, the first through $n^{th}$ hosts HOSTa 200*a* through HOSTn 200*n* of FIG. 1B) may transmit information about the TBW size for each PF and/or the required performance for each PF together, when transmitting the PF data to the storage device 100. In such embodiments, the PF monitoring circuit 511 may use information about the TBW size and/or the required performance for each PF that has been directly provided, without monitoring the TBW size and/or the required performance for each PF.

The FTL 520 may control and/or manage main operations of the storage device 100. For example, the FTL 520 may map a logical page address of the host (e.g., the host 200 of FIG. 1A, the first through $n^{th}$ hosts HOSTa 200*a* through HOSTn 200*n* of FIG. 1B) to the physical page address of the NVM 120. Alternatively or additionally, the FTL 520 may periodically perform garbage collection (GC) to secure a free block for recording data. Referring to FIGS. 1A and 1B together with FIG. 5, a portion of the metric monitoring circuit 112 of the storage controller 110 may be included in the HIL 510. For example, the PF block allocation circuit 111 of the metric monitoring circuit 112 may be included in the FTL 520.

As shown in FIG. 5, the PF block allocation circuit 111 may include a die allocation determination circuit 521 and a die allocation reflection circuit 522. The die allocation determination circuit 521 may use at least one of the performance proportion policy, the performance assurance policy, the die performance-based policy, and the EC-based policy to determine die allocations for each of the plurality of pieces of PF data respectively provided by the plurality of hosts and/or the plurality of applications in the currently active state. That is, the die allocation determination circuit 521 is configured to determine to which die a piece of PF data is to be allocated. When there is a change in the number of plurality of pieces of PF data (e.g., when new PF data is added, an existing PF data is removed), the die allocation reflection circuit 522 may determine how to re-allocate (e.g., re-determine) the die allocation of the plurality of pieces of PF data. For example, the die allocation reflection circuit 522 may perform the die allocation of the PF data that has been changed according to one of a default mode, a delay mode, a dummy mode, and a migration mode.

According to an embodiment, the die allocation determination circuit 521 may respectively allocate the plurality of pieces of PF data to different dies, based on the performance proportion policy. The performance proportion policy may include a policy for allocating the number of dies in proportion to the required performance for each PF. For example, when the write speed required by the first PF data PF1 is twice the write speed required by the second PF data PF2, the number of dies allocated for storing the first PF data PF1 may be twice the number of dies allocated for storing the second PF data PF2. An example of the performance proportion policy is described with reference to FIGS. 8A and 8B.

According to an embodiment, the die allocation determination circuit 521 may respectively allocate the plurality of pieces of PF data to different dies, based on the performance assurance policy. For example, the PF data provided by a particular host, and/or by a particular application, may need to comply with a required write speed and/or a required read speed. In the case of PF data of an application having a high value for a minimum quality of service (QOS), and/or PF data of a host having a high tenant priority, the required read rate and/or the required write rate described above may need to be satisfied. When allocating a die according to the performance proportion policy, the die allocation determination circuit 521 may not satisfy the required write speed and/or the required read speed, and accordingly, may perform the die allocation based on the performance assurance policy. For example, the die allocation determination circuit 521 may group the dies based on the required write speed and the required read speed. An example of the performance assurance policy is described with reference to FIG. 9.

According to an embodiment, the die allocation determination circuit 521 may respectively allocate the plurality of pieces of PF data to different dies, based on the die performance-based policy. The die performance-based policy may be a policy in which the performance of each of the plurality of dies is measured, and the plurality of pieces of PF data are allocated based on the measured performance of each of the plurality of dies. The die allocation determination circuit 521 may receive a die performance monitoring result from the metric monitoring circuit 112, and respectively allocate the plurality of pieces of PF data to different dies. An example of the die performance-based policy is described with reference to FIG. 10.

According to an embodiment, the die allocation determination circuit 521 may respectively allocate the plurality of pieces of PF data to different dies, based on the EC-based policy. The EC-based policy may include a policy for monitoring EC for each die for wear leveling between the plurality of dies, allocating the PF data having high TBW to dies having a low EC, and allocating the PF data having low TBW to dies having a high EC. That is, by programming the PF data having low TBW to a die having high EC, and programming the PF data having high TBW to a die having low EC, and determining a policy to evenly distribute a program/erase (P/E) cycle, durability of the NVM 120 may be maximized. An example of the EC-based policy is described with reference to FIG. 11.

As described above, the die allocation determination circuit 521 may determine the die allocation of the plurality of pieces of PF data according to any one of several policies (e.g., the performance proportion policy, the performance assurance policy, the die performance-based policy, and the EC-based policy), but is not limited thereto. For example, according to various embodiments, the die allocation determination circuit 521 may perform die allocation of the plurality of pieces of PF data by simultaneously considering three policies (e.g., the performance proportion policy, the performance assurance policy, and the die performance-based policy), which considers performance, and the EC-based policy for durability.

The FTL 520 may perform input/output operations of the NVM 120 and the storage controller 110. For example, write data may be programmed to a mapped physical page address via the FTL 520, and/or data of the mapped physical page address may be read. According to an embodiment, a portion of the metric monitoring circuit 112 of the storage controller 110 may be included in the FTL 520. For example, a die monitoring circuit 531 of the metric monitoring circuit 112 may be included in the FTL 520. The die monitoring circuit 531 may monitor indices related to the plurality of dies. For example, the die monitoring circuit 531 may monitor performance values of the plurality of dies, and provide the monitored performance values to the die allocation determination circuit 521.

Alternatively or additionally, the die allocation determination circuit 521 may determine dies to be allocated by respectively distributing the plurality of pieces of PF data based on the performance values of the plurality of dies. For another example, the die monitoring circuit 531 may monitor the EC value of each of the plurality of dies, and provide the EC value of each of the plurality of dies to the die allocation determination circuit 521. When distributing and allocating the plurality of pieces of PF data, by allocating the PF data having a high TBW to a die having high EC, and/or by not allocating the PF data having low TBW to a die having low EC, the die allocation determination circuit 521 may achieve wear leveling between the plurality of dies.

The number and arrangement of components of the storage controller 110 shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. For example, according to various embodiments, the die monitoring circuit 531 may be included in the FTL 520. Alternatively or additionally, a set of (one or more) components shown in FIG. 5 may be integrated with each other and/or implemented as an integrated circuit, as software, and/or a combination of circuits and software.

Figure 6A:
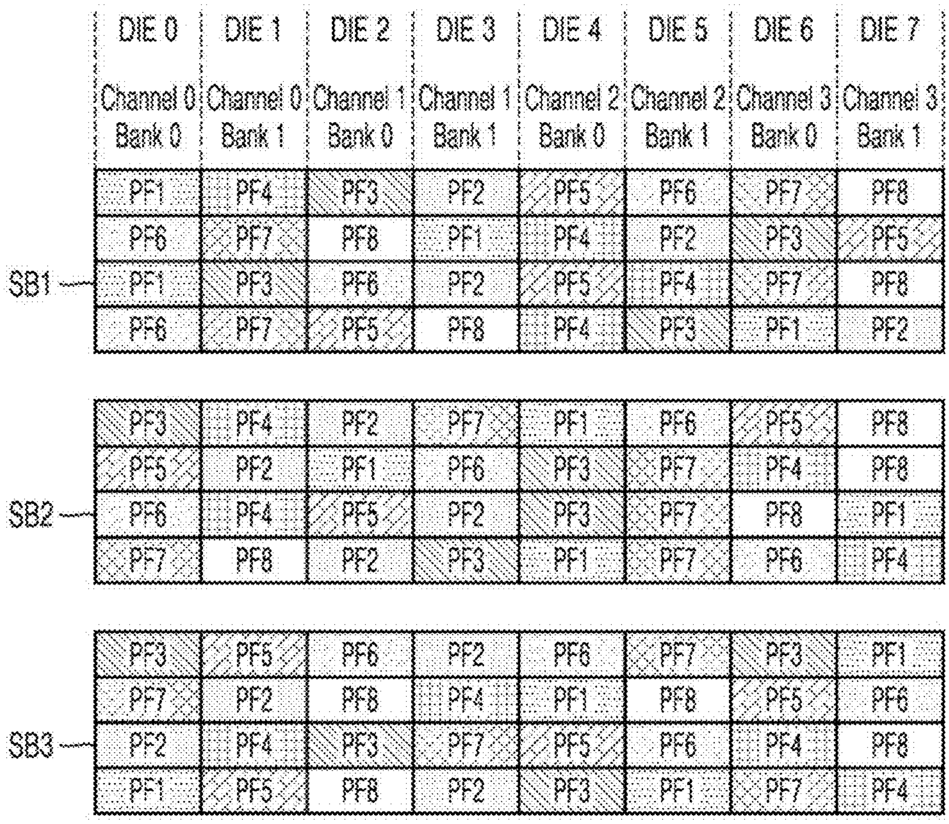
FIG. 6A illustrates an example of a storage state at a time point when a sequential writing of a plurality of pieces of physical function (PF) data has been performed, according to various embodiments of the present disclosure.
Figure 6B:
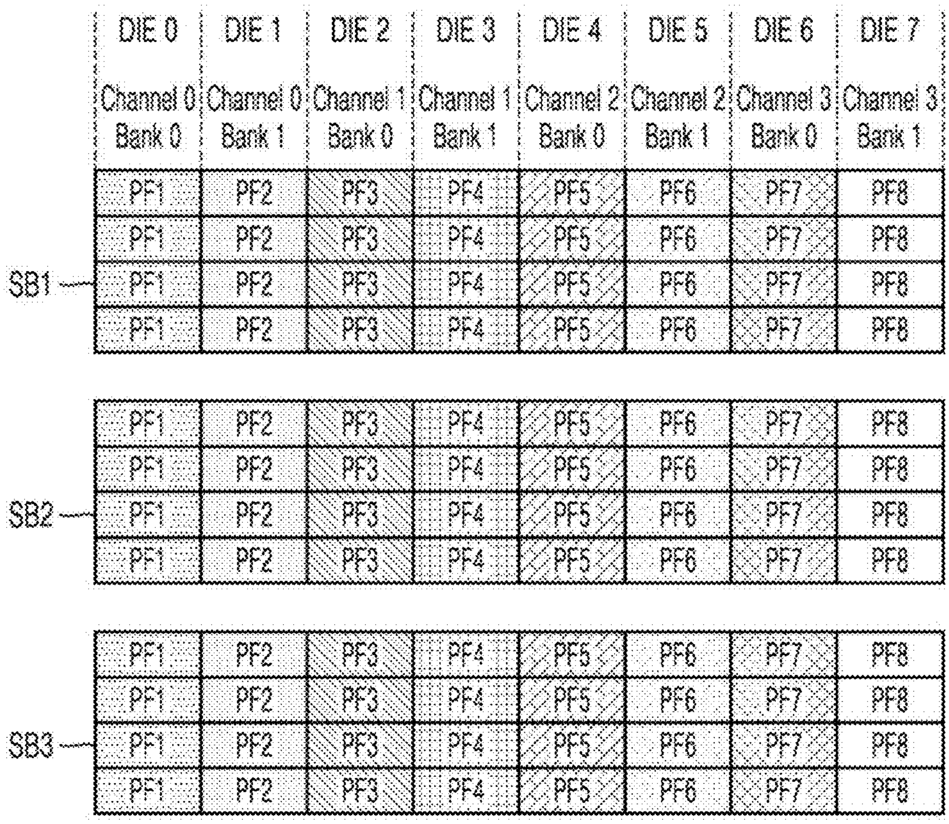
FIG. 6B illustrates another example of a storage state at a time point when a sequential writing of a plurality of pieces of PF data has been performed, according to various embodiments of the present disclosure.

FIG. 6A illustrates a storage state at a time point when sequential writing of the plurality of pieces of PF data has been performed, according to a various embodiments of the present disclosure. FIG. 6B illustrates an example of a storage state at a time point when sequential writing of the plurality of pieces of PF data has been performed, according to various embodiments of the present disclosure.

Referring to FIG. 6A, the storage device 100 may write eight pieces of PF data (e.g., first PF data PF1, second PF data PF2, third PF data PF3, fourth PF data PF4, fifth PF data PF5, sixth PF data PF6, seventh PF data PF7, and eighth PF data PF8). Referring to FIG. 1A, the AP may be have eight applications that are simultaneously running, and each of the eight applications may have requested the storage device 100 to write application data. Referring to FIG. 1B, eight hosts of the plurality of hosts (e.g., first host HOSTa 200*a* through n$^{th}$ host HOSTn 200*n*) may have requested a write operation to the storage device 100.

The storage controller 110, according to various embodiments of the present disclosure, may sequentially receive eight pieces of PF data. Alternatively or additionally, the storage controller 110 sequentially write the received eight pieces of PF data to the NVM 120, according to the received order. In such an embodiment, because data for each PF may not be separately stored, several pieces of the PF data may be mixed inside one physical block PB. For example, as shown in FIG. 6A, the data stored in the physical block PB corresponding to the zeroth die DIE 0 of the first super block SB1 may be identified as the first PF data PF1, the sixth PF data PF6, the first PF data PF1, and the sixth PF data PF6, according to the page order. That is, the physical block of the zeroth die DIE 0 of the first super block SB1 may simultaneously store the first PF data PF1 and the sixth PF data PF6. As a result, because the lifetime characteristics of the first PF data PF1 and the sixth PF data PF6 may be different, and the unit of the erase is a physical block, high GC cost may be incurred.

For another example, as shown in FIG. 6A, the data stored in the physical block corresponding to the second die DIE 2 of the first super block SB1 may be identified as third PF data PF3, eighth PF data PF8, the sixth PF data PF6, and fifth PF data PF5, according to the page order. That is, the physical block may simultaneously store four PF data. As described above, because the lifetime characteristics of the third PF data PF3, the fifth PF data PF5, the sixth PF data PF6, and the eighth PF data PF8 may be different from each other, high GC cost may be incurred.

Referring to FIG. 6B, the plurality of pieces of PF data may be separated from each other and stored in a physical block of the same die. For example, as shown in FIG. 6B, the first PF data PF1 may be allocated to the zeroth die DIE 0, the second PF data PF2 may be allocated to the first die DIE 1, the third PF data PF3 may be allocated to the second die DIE 2, fourth PF data PF4 may be allocated to the third die DIE 3, the fifth PF data PF5 may be allocated to the fourth die DIE 4, the sixth PF data PF6 may be allocated to the fifth die DIE 5, seventh PF data PF7 may be allocated to the sixth die DIE 6, and the eighth PF data PF8 may be allocated to the seventh die DIE 7. Accordingly, because only the PF data having the same lifetime characteristics in one physical block are stored, the GC cost may be reduced, and/or a write amplification factor (WAF) value may also be reduced.

Figure 7:
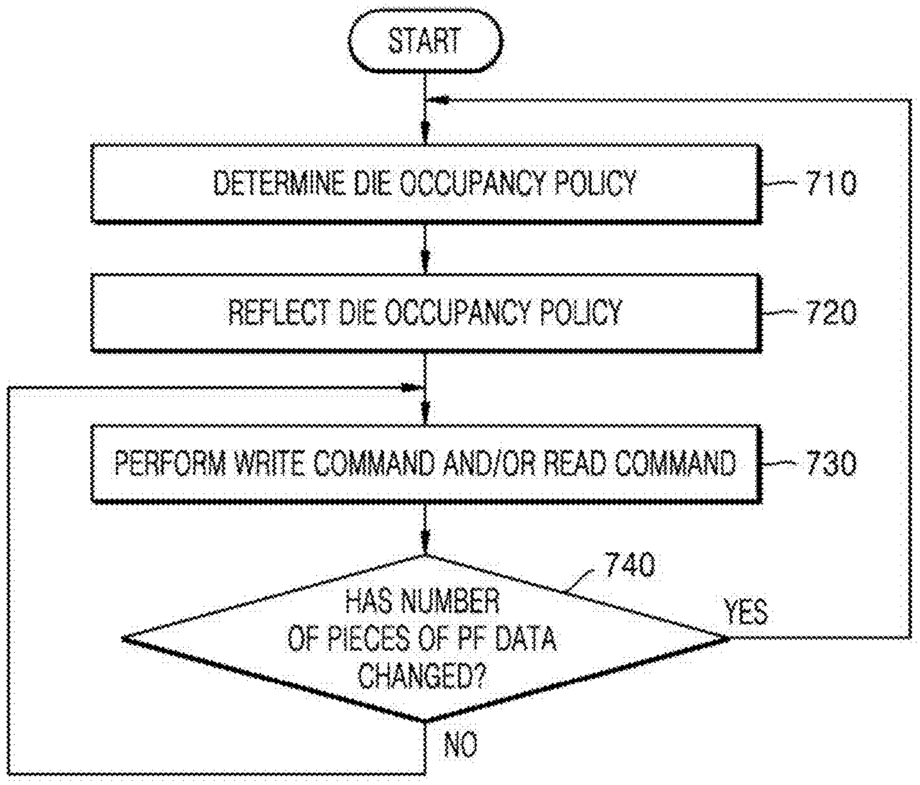
FIG. 7 illustrates another example of a storage state at a time point when a sequential writing of a plurality of pieces of PF data has been performed, according to various embodiments of the present disclosure.

FIG. 7 illustrates another example of a storage state at a time point when a sequential writing of the plurality of pieces of PF data has been performed, according to various embodiments of the present disclosure.

Referring to FIG. 7, in operation 710, the storage controller 110 may determine a die occupancy policy. The die allocation determination circuit 521 of the storage controller 110 may determine a policy of respectively allocating the dies to separate and store the plurality of pieces of PF data.

The die allocation determination circuit 521 may divide and allocate the plurality of pieces of PF data to a plurality of dies, according to at least one of the performance proportion policy, the performance assurance policy, the die performance-based policy, and the EC-based policy. For example, the die allocation determination circuit 521 may adjust the number of allocations to be proportional to the required performance of each of the plurality of pieces of PF data. For another example, when there is PF data requiring performance assurance, the die allocation determination circuit 521 may allocate the dies by grouping the minimum number of dies for the performance assurance. For another example, the performance of the plurality of dies may be monitored, and according to the monitoring result, the dies matching the required performance of each PF may also be allocated. For another example, the die allocation determination circuit 521 may also monitor EC values of the plurality of dies, and allocate the PF data according to the EC value for each die.

In operation 720, the storage controller 110 may reflect the die occupancy policy. That is, the die allocation reflection circuit 522 of the storage controller 110 may separate and allocate the plurality of pieces of PF data to the plurality of dies, based on the allocation policy determined by the die allocation determination circuit 521 in operation 710.

In operation 730, the storage controller 110 may perform a write command and/or a read command. For example, the storage controller 110 may transmit and/or program write data to the plurality of dies allocated by the die allocation reflection circuit 522. The plurality of pieces of PF data may correspond to the plurality of applications of FIG. 1A and/or the plurality of hosts of FIG. 1B. For another example, the storage controller 110 may receive a plurality of read commands corresponding to the plurality of applications of FIG. 1A and/or the plurality of hosts of FIG. 1B, and read the PF data stored in the plurality of dies by using the die allocation reflection circuit 522.

In operation 740, the storage controller 110 may determine whether the number of PF data has been changed. For example, the number of PF data for allocating the plurality of dies at operation 710 may have been three, but one PF may be removed. In such an example, PF data may be deleted when any one of the plurality of applications of FIG. 1A completes an operation and/or when a user of any one of the plurality of hosts of FIG. 1B turns off a device. For another example, the number of PF data for allocating the plurality of dies at operation 710 may have been two, but one PF data may be newly added. That is, when a new application operates in addition to the plurality of applications of FIG. 1A, or when a new host is added in addition to the plurality of hosts of FIG. 1B, the PF data may be added. When the PF data is added or deleted, the policy that has been used to assign the existing PF data may no longer be valid, and thus, may be changed. When the number of PF data is changed, in order to determine the die allocation policy that reflects newly added or deleted PF data, the storage controller 110 may return to operation 710 and reallocate the dies for the changed plurality of pieces of PF data (YES on operation 740). Alternatively or additionally, when the number of PF data is not changed, the storage controller 110 may return to operation 730 and perform a read command and/or a write command on the same plurality of pieces of PF data (NO on operation 740).

Figure 8A:
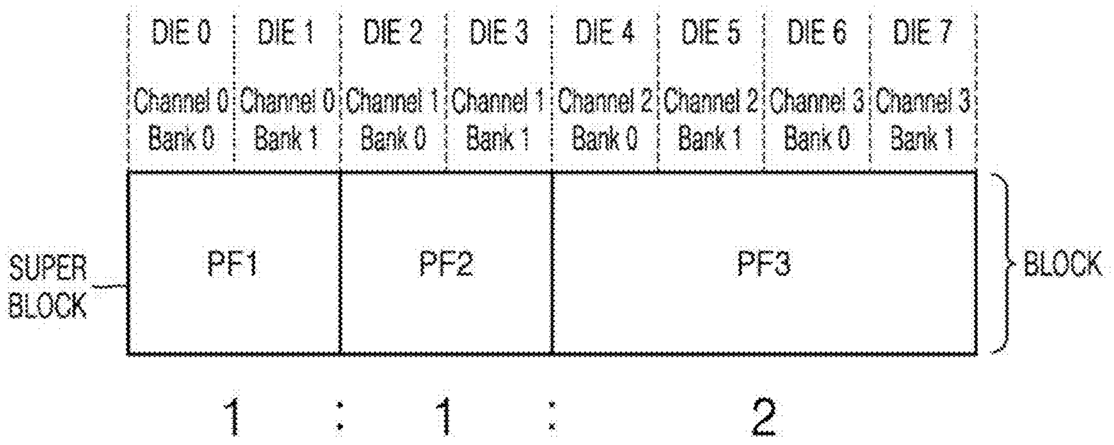
FIGS. 8A and 8B illustrate examples of a performance proportion policy, according to various embodiments of the present disclosure.
Figure 8B:
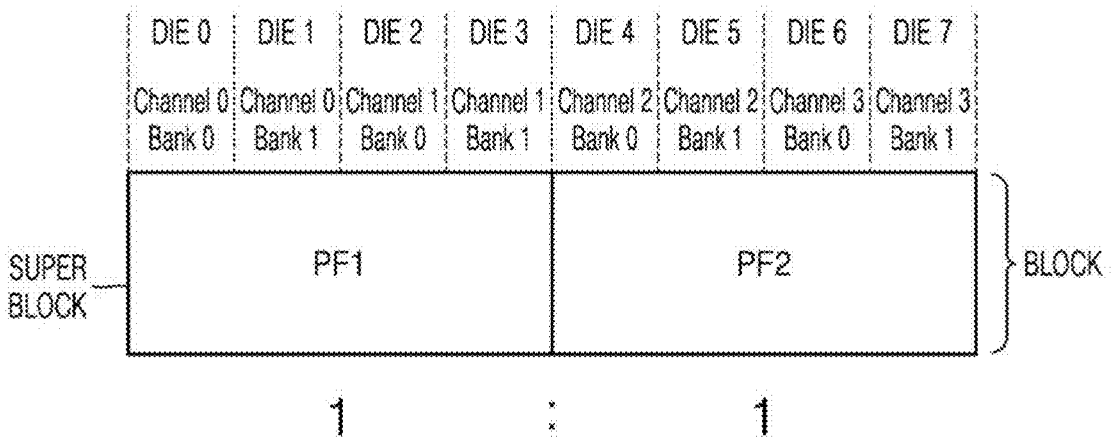

FIGS. 8A and 8B illustrate examples of a performance proportion policy, according to various embodiments of the present disclosure.

Referring to FIG. 8A, the storage controller 110 may receive three PF data (e.g., first PF data PF1, second PF data PF2, and third PF data PF3). For example, the storage controller 110 may receive write data from each of three hosts from a plurality of hosts (e.g., first host HOSTa 200*a*, second host HOSTb 200*b*, and third host HOSTc 200*c* from the plurality of hosts 200*a* to 200*n* of FIG. 1B). The first PF data PF1 may include write data provided by the first host HOSTa 200*a*, the second PF data PF2 may include write data provided by the second host HOSTb 200*b*, and the third PF data PF3 may include write data provided by a third host HOSTc 200*c*. The PF monitoring circuit 511 may monitor a write speed required for each PF data. For example, the write speed required by the first PF data PF1 may be 1000 MB/s, the write speed required by the second PF data PF2 may be 1000 MB/s, and the write speed required by the third PF data may be 2000 MB/s. The die allocation determination circuit 521 may determine the number of dies, to which the first through third PF data PF1 through PF3 are to be allocated, in order to be proportional to the required performance. For example, the die allocation determination circuit 521 may allocate two of all eight dies to the first PF data PF1, two thereof to the second PF data PF2, and four thereof to the third PF data PF3 (e.g., PF1:PF2:PF3=1:1:2).

Referring to FIG. 8B, the storage controller 110 may receive two PF data. For example, the storage controller 110 may receive write data from each of two hosts (e.g., first host HOSTa 200*a* and second host HOSTb 200*b* from the plurality of hosts 200*a* to 200*n* of FIG. 1B).

The first PF data PF1 may include write data provided by the first host HOSTa 200*a*, and the second PF data PF2 may include write data provided by the second host HOSTb 200*b*. The PF monitoring circuit 511 may monitor the write speed required for each PF. For example, the write speed required by the first PF data PF1 may be 1000 MB/s, and the write speed required by the second PF data PF2 may be 1000 MB/s.

The die allocation determination circuit 521 may determine the number of dies, to which the first and second PF data PF1 and PF2 are to be allocated, in order to be proportional to the required performance. For example, the die allocation determination circuit 521 may allocate four dies, half of all eight dies, to the first PF data PF1, and allocate the remaining four dies to the second PF data PF2 (e.g., PF1:PF2=1:1). That is, while the write speed of 1000 MB/s of the first PF data PF1 and the second PF data PF2 may be sufficient with an allocation of two dies, the storage controller 110 may throttle to the extent corresponding to allocation exceeding the write speed.

Figure 9:
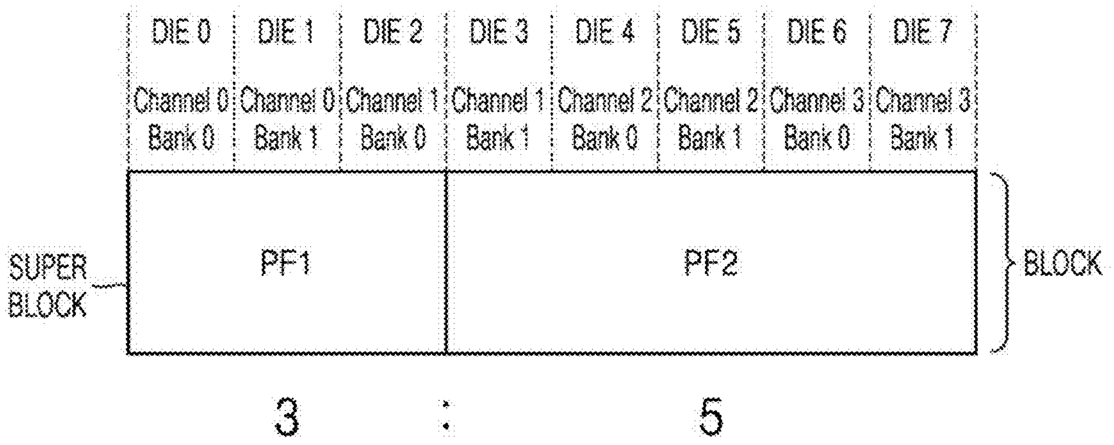
FIG. 9 illustrates an example of a performance assurance policy, according to various embodiments of the present disclosure.

FIG. 9 illustrates an example of the performance assurance policy, according to various embodiments of the present disclosure.

Referring to FIG. 9, the storage controller 110 may receive two PF data (e.g., first PF data PF1 and second PF data PF2). For example, the storage controller 110 may receive write data from each of the two hosts (e.g., first host HOSTa 200*a* and second host HOSTb 200*b* from the plurality of hosts 200*a* to 200*n* of FIG. 1B). The first PF data PF1 may include write data provided by the first host HOSTa 200*a*, and the second PF data PF2 may include write data provided by the second host HOSTb 200*b*. In an embodiment, the second host HOSTb 200*b* may provide the storage device 100 with information about requesting performance assurance based on the minimum QoS and/or high tenant priority together with the write command.

The PF monitoring circuit 511 may monitor the write speed required for each PF. For example, the write speed required by the first PF data PF1 may be 2000 MB/s, and the write speed required by the second PF data PF2 may be 2000 MB/s. Alternatively or additionally, at least five dies may be allocated to ensure the write speed of 2000 MB/s. Referring to FIGS. 8A and 8B together, the die allocation determination circuit 521 may divide and allocate all eight dies in a 1:1 ratio according to the performance proportion policy, but the second PF data PF2, to which four dies are allocated, may not be assured of the write speed. Referring to FIG. 9, the die allocation determination circuit 521 may first allocate five dies required for the performance assurance of the second PF data PF2 of eight dies to the second PF data PF2, and may allocate the remaining three dies to the first PF data PF1 (e.g., PF1:PF2=3:5).

Figure 10:
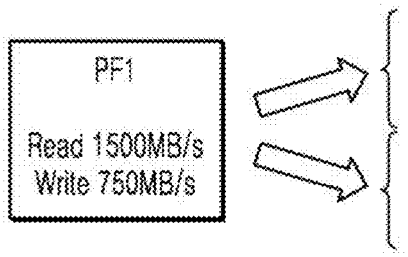
FIG. 10 illustrates an example of a die performance-based policy, according to various embodiments of the present disclosure.

FIG. 10 illustrates an example of the die performance-based policy, according to various embodiments of the present disclosure.

Referring to FIG. 10, the storage controller 110 may monitor performance for each die of the plurality of dies. The die monitoring circuit 531 may measure die performance of each of the zeroth die DIE 0 through the third die DIE 3, and store the measured die performance in the form of a table. A table 1000 may store result values of monitoring die performance of the zeroth die DIE 0 through the third die DIE 3. For example, the zeroth die DIE 0 may have read performance of 1000 MB/s, and write performance of 500 MB/s. The first die DIE 1 may have read performance of 500 MB/s and write performance of 250 MB/s. The second die DIE 2 may have read performance of 1000 MB/s and write performance of 500 MB/s. The third die DIE 3 may have read performance of 500 MB/s and write performance of 250 MB/s. In an embodiment, the die monitoring circuit 531 may provide the table 1000 to the die allocation determination circuit 521.

The die allocation determination circuit 521 may determine a die, to which the first PF data PF1 is allocated, based on the table 1000 provided by the die monitoring circuit 531. For example, the read speed required by the first PF data PF1 may be 1500 MB/s, and the write speed may be 750 MB/s. The die allocation determination circuit 521 may determine a combination of dies to satisfy performance required by the first PF data PF1 according to the die performance-based policy. For example, the die allocation determination circuit 521 may also determine to allocate the zeroth die DIE 0 and the first die DIE 1 to the first PF data PF1. Alternatively or additionally, the die allocation determination circuit 521 may determine to allocate the second die DIE 2 and the third die DIE 3 to the first PF data PF1.

In an embodiment, the die allocation determination circuit 521 may allocate dies in excess of the required performance of the first PF data PF1, by allocating the zeroth die DIE 0 and the second die DIE 2. When the dies exceeding the required performance are allocated, the storage controller 110 may also throttle when performing the read command and/or write command of the first PF data PF1.

Figure 11:
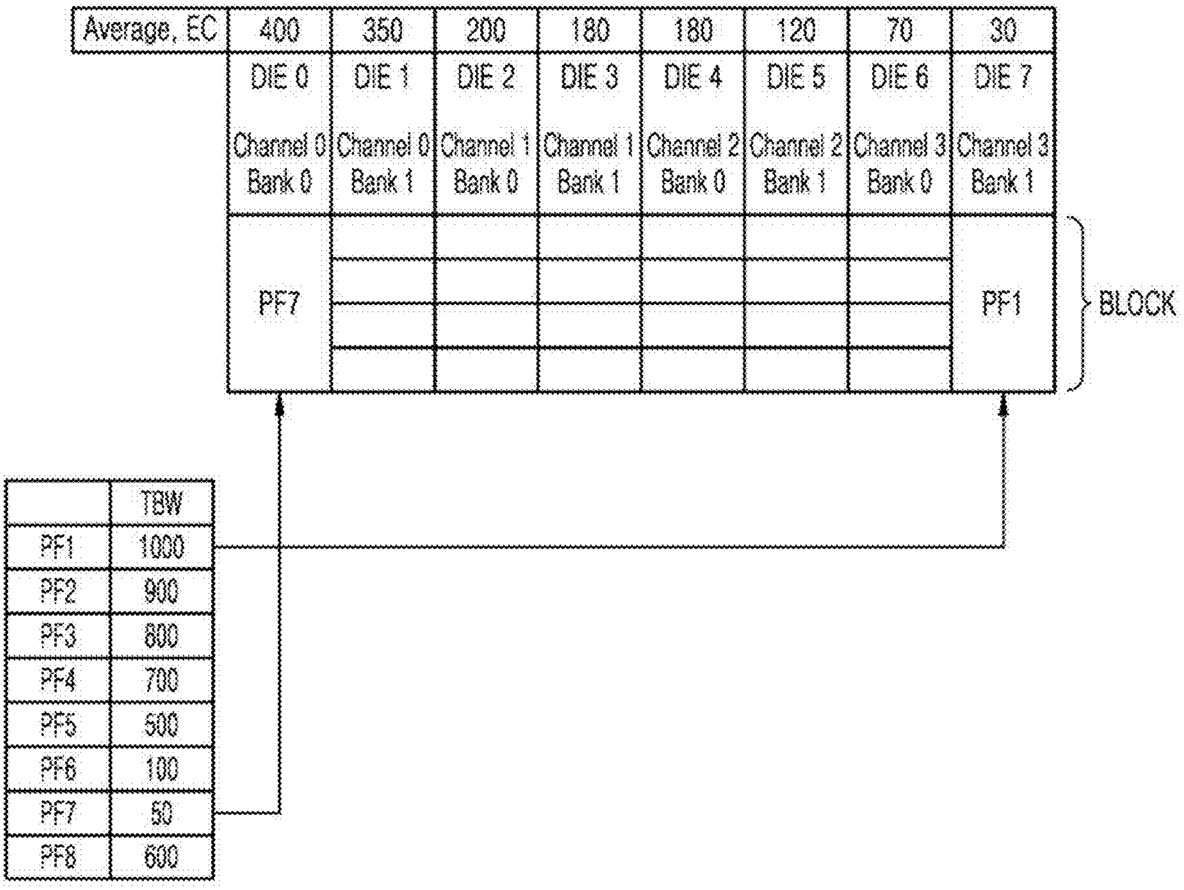
FIG. 11 illustrates an example of an erase count (EC)-based policy, according to various embodiments of the present disclosure.

FIG. 11 illustrates an example of an EC-based policy, according to various embodiments of the present disclosure.

Referring to FIG. 11, the storage controller 110 may monitor EC values of the plurality of dies. The die monitoring circuit 531 may monitor and store an EC value of each of the plurality of dies. For example, after monitoring the zeroth die DIE 0 through the seventh die DIE 7, the zeroth die DIE 0 may have the largest EC value of 400, and the seventh die DIE 7 may have the smallest EC value of 30. In an embodiment, the die monitoring circuit 531 may provide a monitoring result of EC values of the plurality of dies to the die allocation determination circuit 521.

According to various embodiments, the die allocation determination circuit 521 may receive the monitoring result, and determine whether to allocate dies using the the EC-based policy. For example, the die allocation determination circuit 521 may, based on the monitoring result, identify each of the highest EC value and the lowest EC value of the EC values of the plurality of dies. Alternatively or additionally, the die allocation determination circuit 521 may determine to use the EC-based policy when a difference between the highest EC value and the lowest EC value exceeds a threshold value. In an embodiment, the EC-based policy may perform wear leveling between the plurality of dies. However, considering the EC-based policy every time, even when the differences in EC values between the plurality of dies are not large, may increase complexity of the die allocation.

The die allocation determination circuit 521 may allocate the die so that the TBW value of the PF data is inversely proportional to the EC value. For example, of the plurality of pieces of PF data, the TBW of the first PF data PF1 may be the largest as 1000, and the TBW of the seventh PF data PF7 may be the smallest as 50. The die allocation determination circuit 521 may allocate the first PF data PF1 having the high TBW to the seventh die DIE 7 having the low EC, and may allocate the seventh PF data PF7 having the low TBW to the zeroth die DIE 0 having the high EC.

Figure 12:
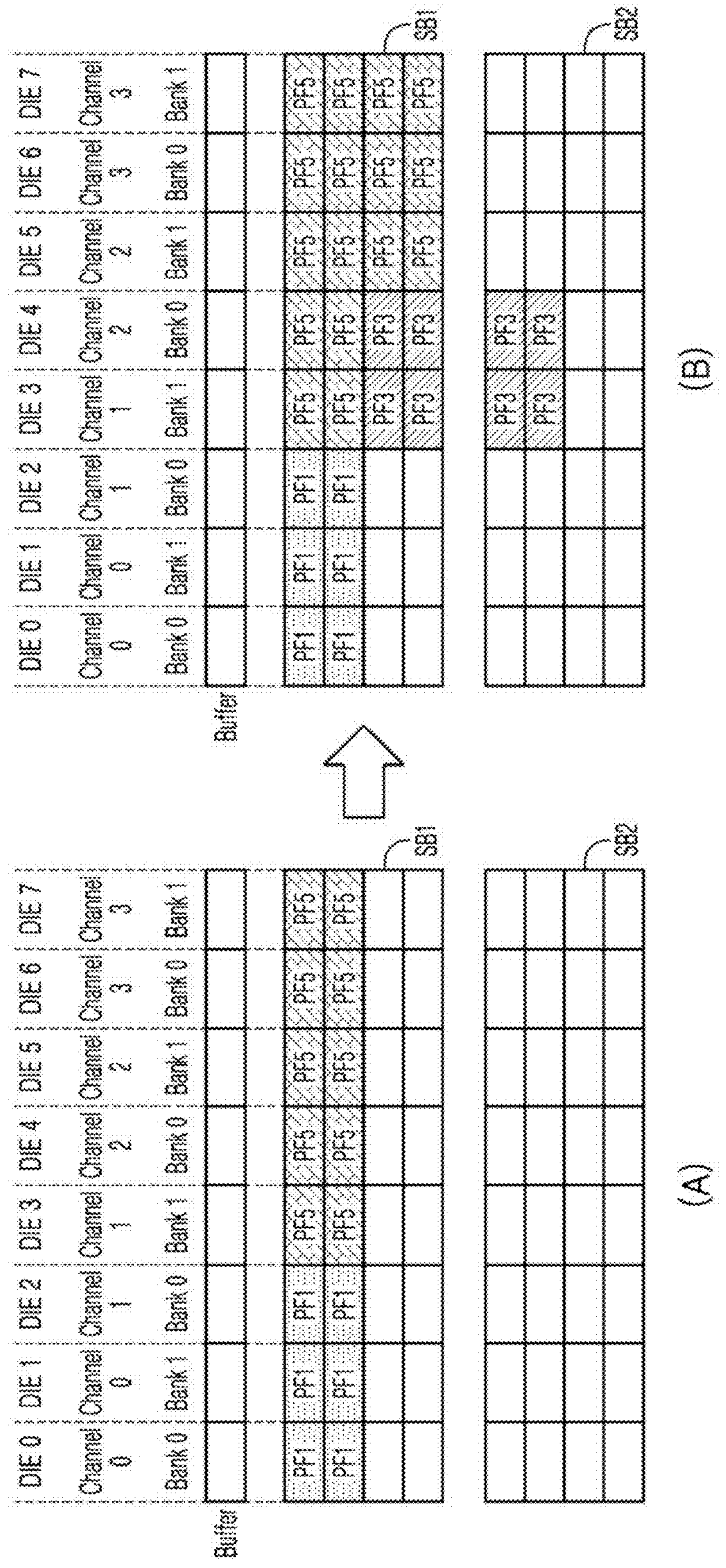
FIG. 12 illustrates an example of allocating dies to additional PF data according to a continued write mode, according to various embodiments of the present disclosure.

FIG. 12 illustrates an example of allocating the dies to additional PF data according to the continued write mode, according to various embodiments of the present disclosure.

Referring to FIG. 12, the third PF data PF3 may be newly added. For example, a first storage state may be a result of performing, by the storage controller 110, the die allocation on the first PF data PF1 and the fifth PF data PF5 (e.g., (A) of FIG. 12). That is, the first storage state may correspond to a previous storage state of FIG. 12. For example, the write speed required by the first PF data PF1 may be 600 MB/s, and the write speed required by the fifth PF data PF5 may be 1000 MB/s. The die allocation determination circuit 521 may allocate three of the eight dies to the first PF data PF1 and the remaining five dies to the fifth PF data PF5, based on the performance proportion policy. In such an example, it may be assumed that the zeroth through seventh dies DIE 0 through DIE 7 have the same performance.

A second storage state may be a result of performing, by the storage controller 110, the die allocation on the third PF data PF3 based on the continued write mode (e.g., (B) of FIG. 12). That is, the second storage state may correspond to a subsequent storage state of FIG. 12. For example, when a new tenant is added in a multi-tenant environment, the new host tenant may request to write the third PF data PF3. In such an example, the write speed required by the third PF data PF3 may be 400 MB/s. Alternatively or additionally, the new host may provide the storage device 100 with information about requesting performance assurance together with the third PF data PF3. The storage controller 110 may allocate at least two dies to the third PF data PF3 according to the performance assurance policy, based on the information about requesting the performance assurance. For example, the die allocation determination circuit 521 may allocate the third die DIE 3 and the fourth die DIE 4 to the third PF data PF3.

When allocating the third PF data PF3 to the third die DIE 3 and the fourth die DIE 4, the die allocation reflection circuit 522 may determine the allocation according to the continued write mode. The continued write mode may be referred to as a mode of storing in succession to a physical block of a die allocated to an added PF data. For example, at the time point when the third PF data PF3 is added, each of the physical blocks of the third die DIE 3 and the fourth die DIE 4 may already have the fifth PF data PF5 stored in half of pages PG1 and PG2. The die allocation reflection circuit 522 may store the third PF data PF3 in the remaining pages PG3 and PG4 of the third die DIE 3 and the fourth die DIE 4, respectively. That is, the third PF data PF3 may be stored in succession to the fifth PF data PF5. In the case of the continued write mode, because a separate write operation is not performed on open pages PG3 and PG4, where the fifth PF data PF5 is not stored, latency may not occur. Alternatively or additionally, in the case of the continued write mode, because different PF data (e.g., the third PF data PF3 and the fifth PF data PF5) are mixed inside the physical blocks respectively corresponding to the third die DIE 3 and fourth die DIE 4, the GC cost may increase. Consequently, when the lifetime characteristics of the third PF data PF3 is short and accordingly, the third PF data PF3 needs to be erased, the fifth PF data PF5 may also need to be erased, according to a minimum erase unit.

Figure 13:
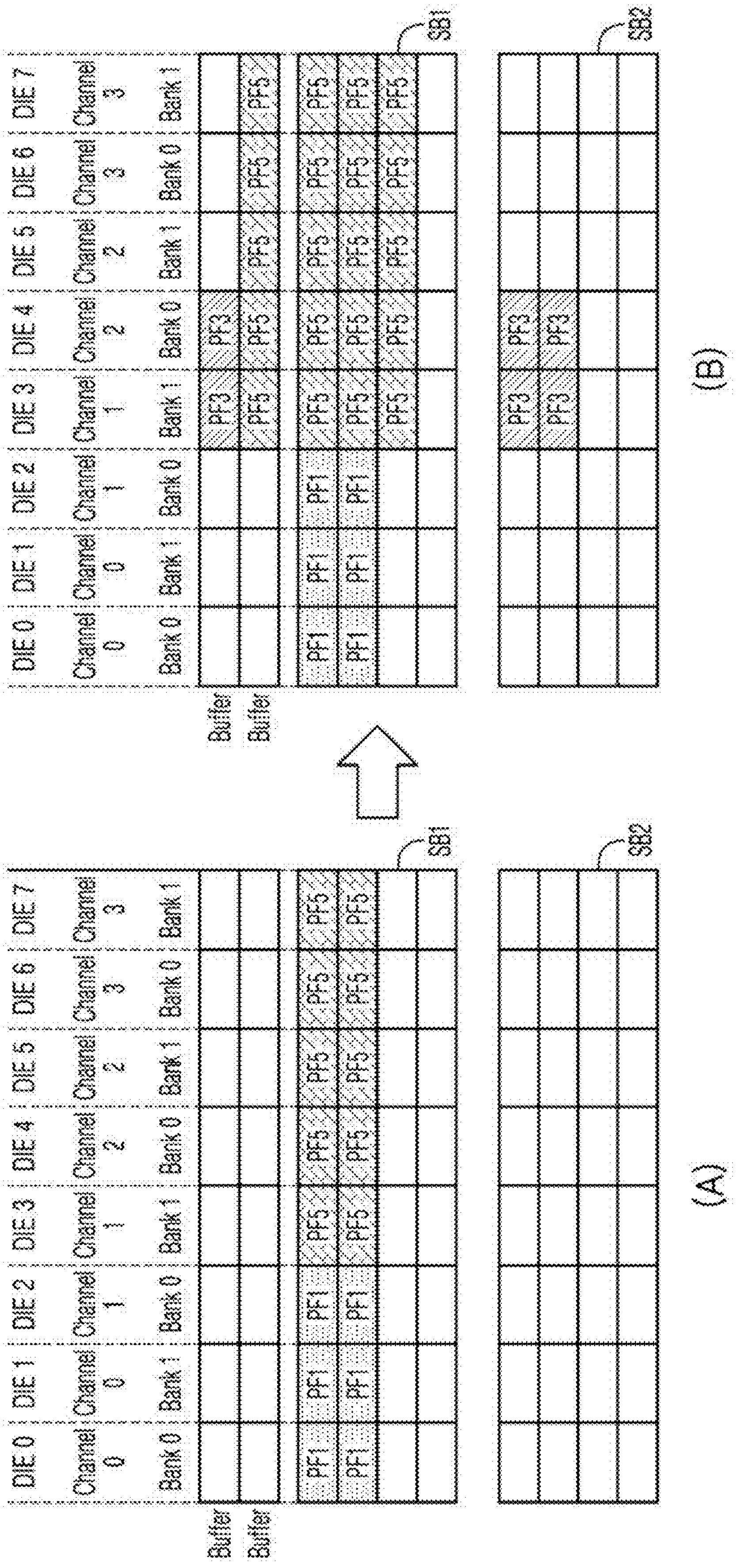
FIG. 13 illustrates an example of allocating a die to additional PF data according to a delay mode, according to various embodiments of the present disclosure.

FIG. 13 illustrates an example of allocating dies to additional PF data according to a delay mode, according to various embodiments of the present disclosure.

Referring to FIG. 13, the third PF data PF3 may be newly added. For example, a third storage state may be a result of performing, by the storage controller 110, the die allocation on the first PF data PF1 and the fifth PF data PF5 (e.g., (A) of FIG. 13). The third storage state may correspond to a previous storage state of FIG. 13. For example, the write speed required by the first PF data PF1 may be 600 MB/s, and the write speed required by the fifth PF data PF5 may be 1000 MB/s. The die allocation determination circuit 521 may allocate three of the eight dies to the first PF data PF1, and the remaining five dies to the fifth PF data PF5, based on the performance proportion policy. In such an example, it may be assumed that the zeroth through seventh dies DIE 0 through DIE 7 have the same performance.

A fourth storage state may be a result of performing, by the storage controller 110, the die allocation on the third PF data PF3 based on the continued write mode (e.g., (B) of FIG. 13). That is, the fourth storage state may correspond to a subsequent storage state of FIG. 13. For example, when a new tenant is added in a multi-tenant environment, the new host tenant may request the write of the third PF data PF3. In such an example, the write speed required by the third PF data PF3 may be 400 MB/s. Alternatively or additionally, the new host may provide the storage device 100 with information about requesting performance assurance together with the third PF data PF3. The storage controller 110 may allocate at least two dies to the third PF data PF3 according to the performance assurance policy, based on the information about requesting the performance assurance. For example, the die allocation determination circuit 521 may allocate the third die DIE 3 and the fourth die DIE 4 to the third PF data PF3.

When allocating the third PF data PF3 to the third die DIE 3 and the fourth die DIE 4, the die allocation reflection circuit 522 may determine the allocation according to the delay mode. The delay mode may include a mode, in which the die allocation reflection circuit 522 may wait until the physical blocks of the die allocated to the added PF data are occupied. For example, at the time point when the third PF data PF3 is added, each of the physical blocks of the third die DIE 3 and the fourth die DIE 4 may already have the fifth PF data PF5 stored in half of pages PG1 and PG2. The die allocation reflection circuit 522 may wait until both physical blocks of the third die DIE 3 and the fourth die DIE 4 are stored as fifth PF data PF5. After the physical blocks of the third die DIE 3 and the fourth die DIE 4 are stored as the fifth PF data PF5, the die allocation reflection circuit 522 may store the third PF data PF3 in the physical blocks of the second super block SB2 corresponding to the third die DIE 3 and the fourth die DIE 4. In the case of the delay mode, latency may occur because the write of the third PF data PF3 may need to be temporarily delayed until the fifth PF data PF5 is allocated on both the remaining pages PG3 and PG4 of the third die DIE 3 and the fourth die DIE 4. Alternatively or additionally, while the writing of the third PF data PF3 is delayed, there may be a need to provide a buffer additionally for temporarily storing the third PF data PF3. Furthermore, the capacity of power loss protection (PLP) for supporting the third PF data PF3 to be temporarily stored while the writing of the third PF data PF3 may be delayed.

However, considering the fourth storage state according to the delay mode, the GC cost may be reduced because different PF data are not mixed and stored inside one physical block, but only the same PF data are stored inside one physical block.

Figure 14:
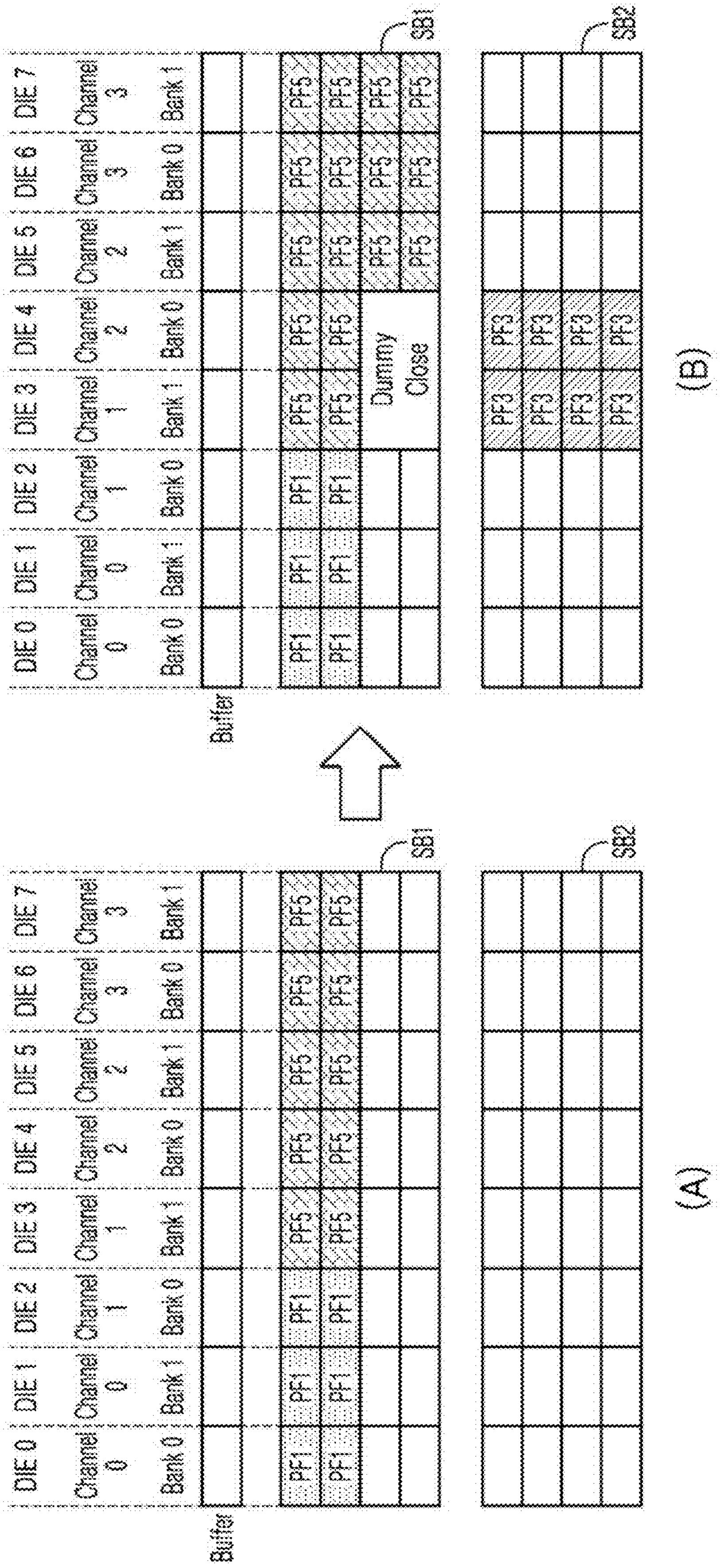
FIG. 14 illustrates an example of allocating dies to additional PF data according to a dummy mode, according to various embodiments of the present disclosure.

FIG. 14 illustrates an example of allocating dies to additional PF data according to a dummy mode, according to various embodiments of the present disclosure.

Referring to FIG. 14, the third PF data PF3 may be newly added. For example, a fifth storage state may be a result of, by the storage controller 110, performing the die allocation on the first PF data PF1 and the fifth PF data PF5 (e.g., (A) of FIG. 14). That is, the fifth storage state may correspond to a previous storage state of FIG. 14. For example, the write speed required by the first PF data PF1 may be 600 MB/s, and the write speed required by the fifth PF data PF5 may be 1000 MB/s. The die allocation determination circuit 521 may allocate three of the eight dies to the first PF data PF1 and the remaining five dies to the fifth PF data PF5, based on the performance proportion policy. In such an example, it may be assumed that the zeroth through seventh dies DIE 0 through DIE 7 have the same performance.

A sixth storage state may be a result of, by the storage controller 110, performing the die allocation on the third PF data PF3 based on the dummy mode (e.g., (B) of FIG. 14). That is, the sixth storage state may correspond to a subsequent storage state of FIG. 14. For example, when a new tenant is added in a multi-tenant environment, the new host tenant may request to write the third PF data PF3. In such an example, the write speed required by the third PF data PF3 may be 400 MB/s. Alternatively or additionally, the new host may provide the storage device 100 with information about requesting performance assurance together with the third PF data PF3. The storage controller 110 may allocate at least two dies to the third PF data PF3 according to the performance assurance policy, based on the information about requesting the performance assurance. For example, the die allocation determination circuit 521 may allocate the third die DIE 3 and the fourth die DIE 4 to the third PF data PF3.

When allocating the third PF data PF3 to the third die DIE 3 and the fourth die DIE 4, the die allocation reflection circuit 522 may determine the allocation according to the dummy mode. The dummy mode may include a mode, in which an open page of a die allocated to an added PF data is processed as a dummy page, and the added PF data is stored from the subsequent super block. For example, at the time when the third PF data PF3 is added, each of the physical blocks of the third die DIE 3 and the fourth die DIE 4 corresponding to the first super block SB1 may already have the fifth PF data PF5 stored on half the pages PG1 and PG2. The die allocation reflection circuit 522 may not wait until the physical blocks of the third die DIE 3 and the fourth die DIE 4 are all stored, and/or may not store the third PF data PF3. However, the die allocation reflection circuit 522 may convert the open page to the dummy page. That is, the die allocation reflection circuit 522 may write random data to the empty pages PG3 and PG4 of the physical blocks of the third die DIE 3 and the fourth die DIE 4 of the first super block SB1, and thereby may process the open page as the dummy page. Thereafter, the die allocation reflection circuit 522 may store the third PF data PF3 from the physical block of the third die DIE 3 and the fourth die DIE 4 corresponding to the second super block SB2 of a next order. According to the dummy mode, a large number of dummy pages, on which random data is written, may be generated, which may be disadvantageous in terms of over-provisioning. Alternatively, considering the sixth storage state according to the dummy mode, the GC cost may be reduced because different PF data are not mixed and stored inside one physical block, but only the same PF data are stored inside one physical block, and/or the same PF data and the random data are stored together.

Figure 15:
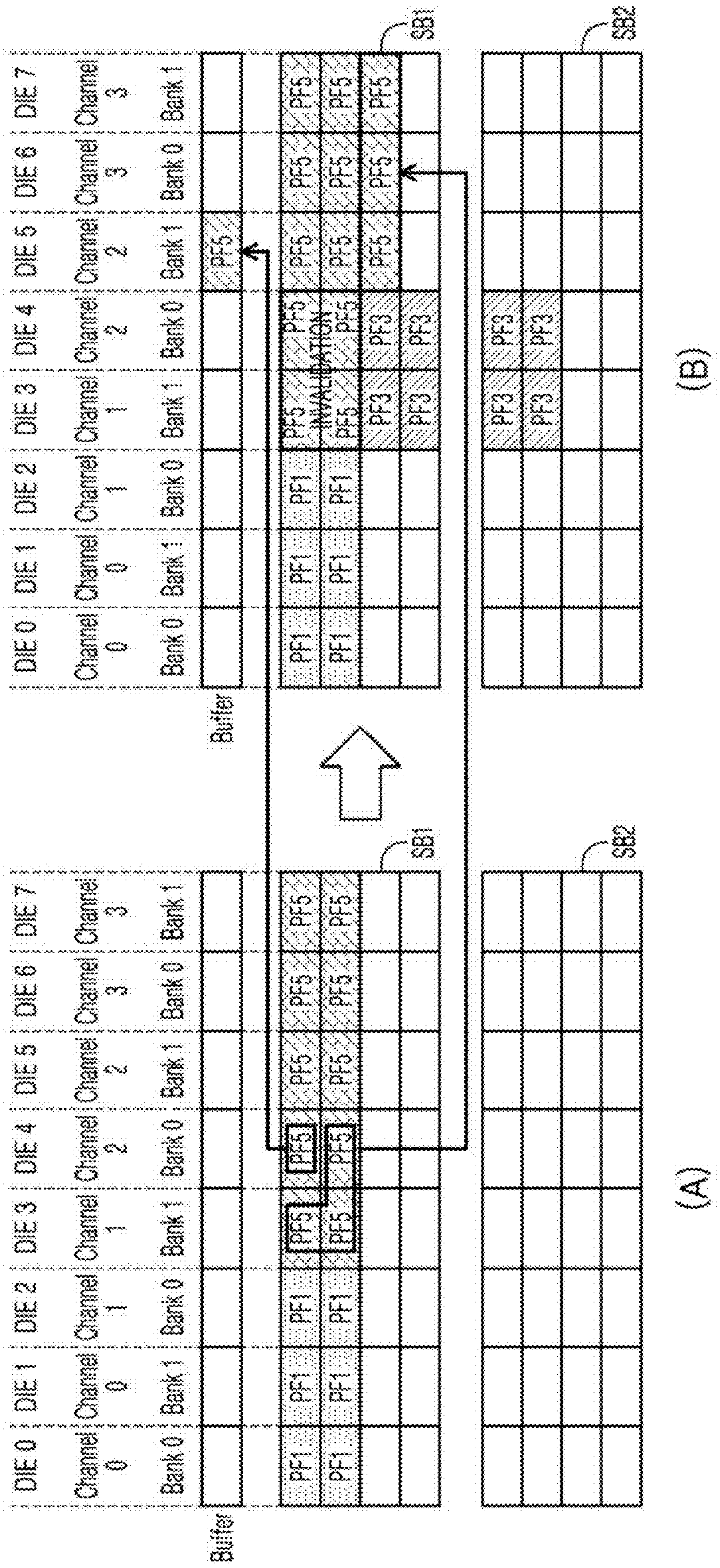
FIG. 15 illustrates an example of allocating dies to additional PF data according to a migration mode, according to various embodiments of the present disclosure.

FIG. 15 illustrates an example of allocating dies to additional PF data according to a migration mode, according to various embodiments of the present disclosure.

Referring to FIG. 15, the third PF data PF3 may be newly added. For example, a seventh storage state may be a result of performing, by the storage controller 110, the die allocation on the first PF data PF1 and the fifth PF data PF5 (e.g., (A) of FIG. 15). That is, the seventh storage state may correspond to a previous storage state of FIG. 15. For example, the write speed required by the first PF data PF1 may be 600 MB/s, and the write speed required by the fifth PF data PF5 may be 1000 MB/s. The die allocation determination circuit 521 may allocate three among the eight dies to the first PF data PF1 and the remaining five dies to the fifth PF data PF5, based on the performance proportion policy. In such an example, it may be assumed that all of the zeroth through seventh dies DIE 0 through DIE 7 have the same performance.

An eighth storage state may be a result of, by the storage controller 110, performing the die allocation on the third PF data PF3 based on the dummy mode (e.g., (B) of FIG. 15). The eighth storage state may correspond to a subsequent storage state of FIG. 15. For example, when a new tenant is added in a multi-tenant environment, the new host tenant may request to write the third PF data PF3. In such an example, the write speed required by the third PF data PF3 may be 400 MB/s. Alternatively or additionally, the new host may provide the storage device 100 with information about requesting performance assurance together with the third PF data PF3. The storage controller 110 may allocate at least two dies to the third PF data PF3 according to the performance assurance policy, based on the information about requesting the performance assurance. For example, the die allocation determination circuit 521 may allocate the third die DIE 3 and the fourth die DIE 4 to the third PF data PF3.

When allocating the third PF data PF3 to the third die DIE 3 and the fourth die DIE 4, the die allocation reflection circuit 522 may determine the allocation according to the migration mode. The migration mode may invalidate the existing PF data pre-stored in the physical block of the die allocated to the added PF data, transfer the invalidated existing PF data to the physical block of the remaining die allocated to the existing PF data and perform a new write, and store in succession to other pages PG3 and PG4 of the physical block of the die allocated to the added PF data. That is, the third PF data PF3 may be stored in succession to the invalidated fifth PF data PF5. For example, at the time when the third PF data PF3 is added, each of the physical blocks of the third die DIE 3 and the fourth die DIE 4 corresponding to the first super block SB1 may already have the fifth PF data PF5 stored on half the pages PG1 and PG2. The die allocation reflection circuit 522 may invalidate the fifth PF data PF5 pre-stored in the physical blocks of the third die DIE 3 and the fourth die DIE 4 corresponding to the first super block SB1. The die allocation reflection circuit 522 may, prior to the invalidation, copy the fifth PF data PF5 pre-stored in the physical blocks of the third die DIE 3 and the fourth die DIE 4 to page PG3 of a next order to the remaining dies (e.g., the fifth through seventh dies DIE 5 through DIE 7). When the size of the pre-stored fifth PF data PF5 exceeds the size that may be simultaneously written by using the remaining dies, a portion of the pre-stored fifth PF data PF5 may be stored in a buffer. The die allocation reflection circuit 522 may store the third PF data PF3 in succession to the invalidated fifth PF data PF5. For example, the third PF data PF3 may be sequentially written in empty pages PG3 and PG4 of the physical blocks of the third die DIE 3 and the fourth die DIE 4.

In the case of the migration mode, latency may occur in the process of rearrangement of migration of the existing PF data. Alternatively or additionally, according to the migration mode, the GC cost may be reduced, because different PF data may not be mixed and stored inside one physical block, and instead, only the same PF data are stored inside one physical block, and/or the same PF data and the invalidated data are stored together.

Figure 16A:
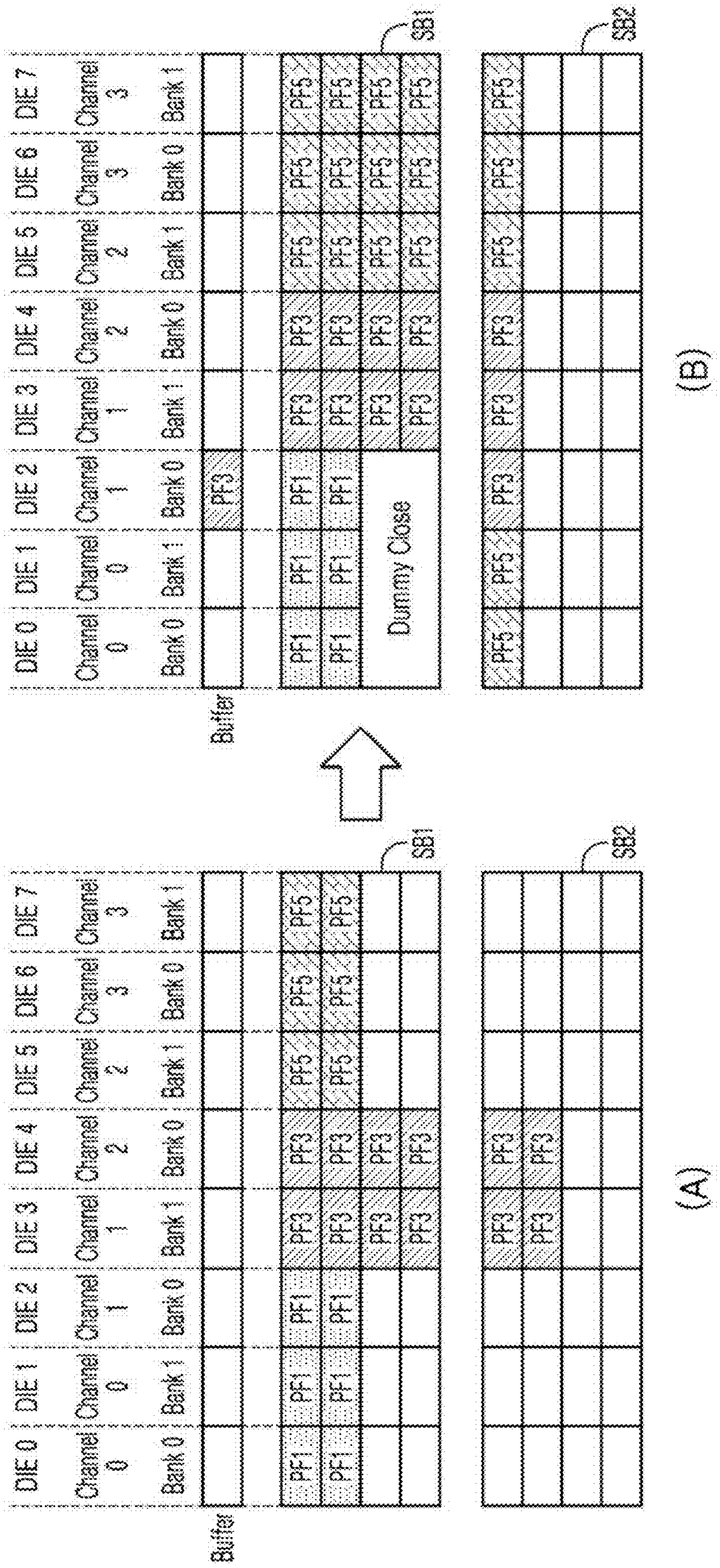
FIG. 16A illustrates an example of reallocating dies when PF data has been deleted according to a dummy mode, according to various embodiments of the present disclosure.
Figure 16B:
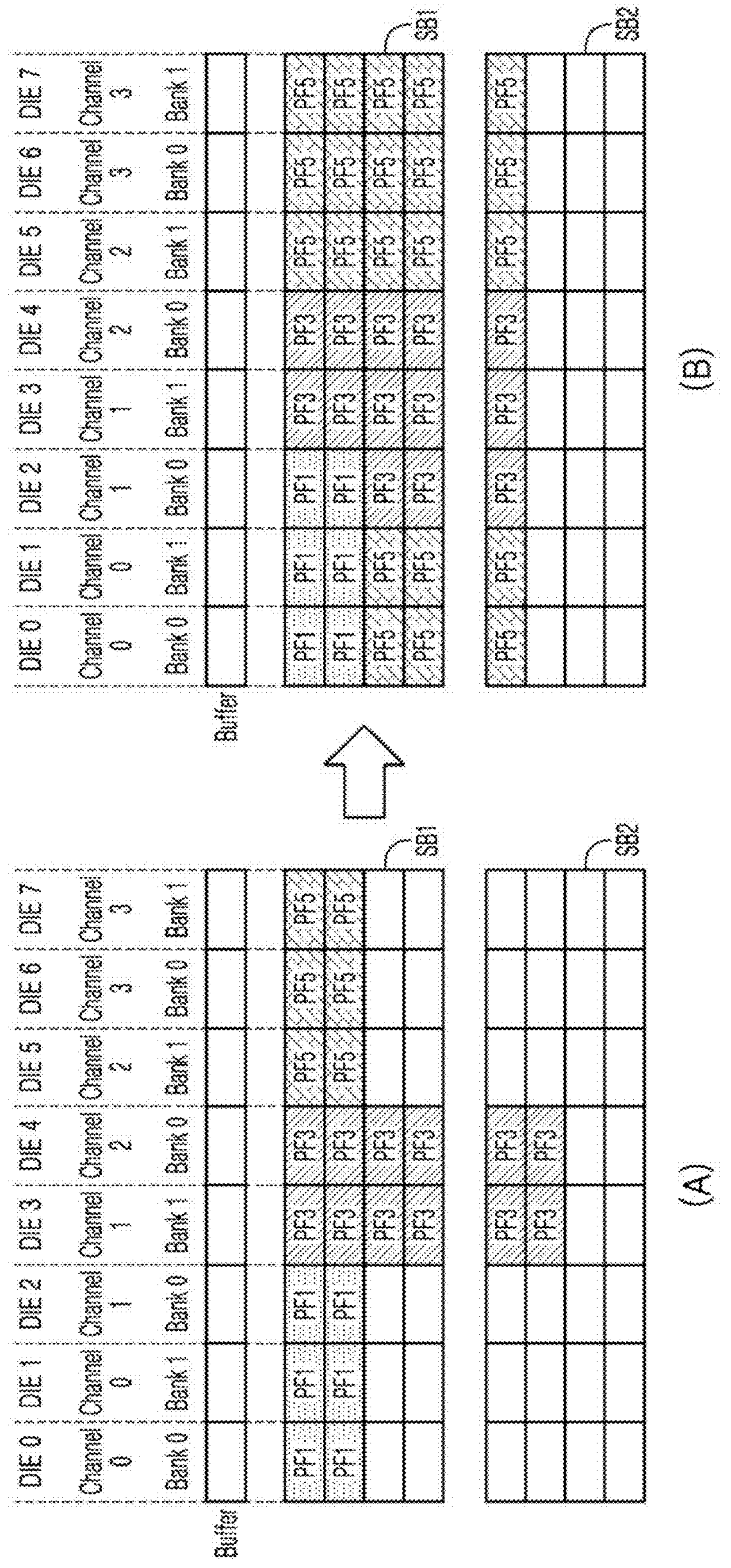
FIG. 16B illustrates an example of reallocating dies when PF data has been deleted according to a continued write mode, according to various embodiments of the present disclosure.

FIG. 16A illustrates an example of reallocating dies when the PF data has been deleted according to the dummy mode, according to various embodiments of the present disclosure. FIG. 16B illustrates an example of reallocating dies when the PF data has been deleted according to a continued write mode, according to various embodiments of the present disclosure.

Referring to FIG. 16A, the number of pieces of PF data may be reduced. For example, when the application corresponding to the first PF data PF1 of the plurality of applications of FIG. 1A is terminated, and/or when a device of a host corresponding to the first PF data PF1 of the first through $n^{th}$ hosts HOSTa through HOSTn of FIG. 1B is turned off, the dies assigned to the third PF data PF3 may be released.

Referring to FIG. 16A, before the dies allocated to the first PF data PF1 are released, the dies allocated to the first PF data PF1 may include the zeroth through second dies DIE 0 through DIE 2, the dies allocated to the third PF data PF3 may include the third and fourth dies DIE 3 and DIE 4, and the dies allocated to the fifth PF data PF5 may include the fifth through seventh dies DIE 5 through DIE 7.

The die allocation determination circuit 521 may reallocate the released dies to the remaining PF data, that is, the third and fifth PF data PF3 and PF5, except for the first PF data PF1. The dies allocated to the first PF data PF1 may be released. For example, when the write speed required by the third PF data PF3 is 600 MB/s and the write speed required by the fifth PF data PF5 is 1000 MB/s, after the releasing, the die allocation determination circuit 521 may allocate one die of the three dies already allocated to the first PF data PF1 to the third PF data PF3, and two dies thereof to the fifth PF data PF5. In such an example, the die allocation determination circuit 521 may reallocate, to the third PF data PF3, the second die DIE 2 adjacent to the dies (e.g., the third die DIE 3 and the fourth die DIE 4) occupied by the third PF data PF3.

Referring to FIG. 16A, when allocating the released dies (e.g., the zeroth through second dies DIE 0 through DIE 2) to the third PF data PF3 and the fifth PF data PF5, the die allocation reflection circuit 522 may determine to allocate them according to the dummy mode. The die allocation reflection circuit 522 may process an open page as the dummy page by writing random data on the open page (or an empty page) among the physical blocks corresponding to the zeroth through second dies DIE 0 through DIE 2 allocated to the existing first PF data PF1. Thereafter, the die allocation reflection circuit 522 may store the fifth PF data PF5 from the physical blocks of the zeroth and first dies DIE 0 and DIE 1 corresponding to the second super block SB2 of a next order, and may store the third PF data PF3 from the physical block of the second die DIE 2.

Referring to FIG. 16B, when allocating the released dies (e.g., the zeroth through second dies DIE 0 through DIE 2) to the third PF data PF3 and the fifth PF data PF5, the die allocation reflection circuit 522 may determine to allocate the released dies according to the continued write mode. The die allocation reflection circuit 522 may perform the write of the PF data, without writing random data on the open page (or an empty page) among the physical blocks corresponding to the zeroth through second dies DIE 0 through DIE 2 allocated to the existing first PF data PF1. For example, at the time when the first PF data PF1 is released, each of the physical blocks of the zeroth through second dies DIE 0 through DIE 2 may already have the first PF data PF1 stored in half of the pages PG1 and PG2, and the other half of the pages PG3 and PG4 may be empty. The die allocation reflection circuit 522 may store the third PF data PF3 in succession to the remaining pages PG3 and PG4 of the second die DIE 2, and may store the fifth PF data PF5 in succession to the remaining pages PG3 and PG4 of the second die DIE 2.

While the present disclosure has been particularly shown and described with reference to embodiments thereof, it is to be understood that various changes in form and details may be made therein without departing from the spirit and scope of the following claims.

What is claimed is:

1. A storage device, comprising:
- a non-volatile memory comprising a plurality of dies, each die of the plurality of dies comprising a plurality of physical blocks; and
- a storage controller configured to:
  - receive, from a host, first physical function (PF) data and second PF data, the first PF data being generated by a first application run by the host, the second PF data being generated by a second application run by the host;
  - measure metrics of the first PF data, the second PF data and the plurality of dies; and
  - allocate, according to a die allocation policy, the first PF data and the second PF data to first dies and second dies, respectively, from among the plurality of dies, based on a first required performance of the first PF data and a second required performance of the second PF data,
  - wherein the first dies are different from the second dies; and
  - wherein the measured metrics comprise:
    - a required performance of each of the first PF data and the second PF data,
    - a terabytes written (TBW) value required by each of the first PF data and the second PF data,
    - an estimated performance of each die of the plurality of dies, and
    - an erase count (EC) value of each die of the plurality of dies.

2. The storage device of claim 1, wherein the die allocation policy comprises a performance proportion policy; and the storage controller is further configured to:
- determine, for each of the first PF data and the second PF data, a number of dies to be allocated to the first PF data and the second PF data that is proportional to a required performance of the first PF data and the second PF data; and
- allocate, according to the performance proportion policy, the determined number of dies from the plurality of dies to each of the first PF data and the second PF data, the dies allocated to each of the first PF data and the second PF data being different from each other.

3. The storage device of claim 1, wherein the die allocation policy comprises an EC-based policy, and the storage controller is further configured to:
- determine; for each of the first PF data and the second PF data, a number of dies to be allocated to the first PF data and the second PF data, based on the TBW values and the EC value;
- allocate a first die from the plurality of dies having a minimum EC value to a piece of the first PF data and the second PF data having a maximum TBW value; and
- allocate a second die from the plurality of dies having a maximum EC value to a piece of the first PF data and the second PF data having a minimum TBW value.

4. The storage device of claim 1, wherein the die allocation policy comprises a performance assurance policy,
- wherein a first subset of the first PF data and the second PF data has a corresponding performance assurance requirement,
- wherein a remaining subset of the first PF data and the second PF data does not have a performance assurance requirement, and
- wherein the storage controller is further configured to:
  - determine, for each of the first subset, a number of dies to be allocated to the first subset satisfying the corresponding performance assurance requirement;
  - determine a minimum number of dies satisfying performance assurance requirements of the first subset;
  - allocate the determined minimum number of dies from the plurality of dies to the first subset, and
  - allocate remaining unallocated dies from the plurality of dies to the remaining subset.

5. The storage device of claim 1, wherein the die allocation policy comprises a die performance-based policy, and the storage controller is further configured to:

determine, for each of the plurality of first PF data and the second PF data, a number of dies to be allocated to each of the first PF data and the second PF data, based on the estimated performance of each die of the plurality of dies; and determine a combination of dies from among the plurality of dies satisfying a required performance of each of the first PF data and the second PF data.

6. A storage device, comprising:

a non-volatile memory comprising a plurality of dies, each die of the plurality of dies comprising a plurality of physical blocks; and a storage controller configured to:

receive first physical function (PF) data from a first host;

receive second PF data from a second host;

allocate first dies from among the plurality of dies to the first PF data, based on a first required performance of the first PF data and a second required performance of the second PF data; and allocate remaining dies from among the plurality of dies to the second PF data, the remaining dies being different from the first dies, wherein the first PF data is separated from the second PF data, wherein the first PF data is stored in first physical blocks of the plurality of physical blocks coupled with the first dies, wherein the second PF data is stored in second physical blocks of the plurality of physical blocks coupled with the remaining dies, the second physical blocks being different from the first physical blocks; and wherein the storage controller comprises:

a die monitoring circuit configured to monitor an erase count (EC) and estimated performance of each of the plurality of dies; and a PF monitoring circuit configured to:

monitor the first required performance and a first terabytes written (TBW) required by the first PF data; and monitor the second required performance and a second TBW required by the second PF data.

7. The storage device of claim 6, wherein the storage controller is further configured to:

determine a number of the first dies such that a ratio of the number of the first dies over a number of the remaining dies matches a ratio of the first required performance of the first PF data over the second required performance of the second PF data.

8. The storage device of claim 6, wherein a first priority of the first host exceeds a second priority of the second host, wherein the storage controller is further configured to determine a number of the first dies that satisfies the first required performance of the first PF data, and wherein a ratio of the number of the first dies over a number of the remaining dies is different from a ratio of the first required performance of the first PF data over the second required performance of the second PF data.

9. The storage device of claim 6, wherein the storage controller is further configured to: when the required first TBW is greater than the required second TBW, allocate the first PF data corresponding to the required first TBW to a first die having a minimum EC value from among the plurality of dies, and allocate the second PF data corresponding to the required second TBW to a second die having a maximum EC value from among the plurality of dies.

10. The storage device of claim 6, wherein the storage controller is further configured to:

determine a combination of dies from among the plurality of dies satisfying the first required performance of the first PF data and the second required performance of the second PF data, based on the estimated performance of each of the plurality of dies.

* * * * *